United States Patent
Nishine

(10) Patent No.: US 8,126,102 B2
(45) Date of Patent: Feb. 28, 2012

(54) COMMUNICATION APPARATUS AND CONTROL METHOD

(75) Inventor: Yasushi Nishine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 537 days.

(21) Appl. No.: 12/318,524

(22) Filed: Dec. 30, 2008

(65) Prior Publication Data

US 2009/0290668 A1 Nov. 26, 2009

(30) Foreign Application Priority Data

May 26, 2008 (JP) ................................ 2008-136597

(51) Int. Cl.
*H04L 7/00* (2006.01)

(52) U.S. Cl. ...................................................... 375/356

(58) Field of Classification Search .................. 375/354, 375/356; 370/351, 389, 400, 408, 503; 709/238, 709/241, 248
See application file for complete search history.

(56) References Cited

U.S. PATENT DOCUMENTS

| | | | |
|---|---|---|---|
| 4,939,752 A | 7/1990 | Literati | 375/107 |
| 6,169,753 B1 * | 1/2001 | Yoshida | 370/507 |
| 6,173,023 B1 | 1/2001 | Tanonaka | 375/357 |
| 6,990,517 B1 | 1/2006 | Bevan | 709/223 |
| 2001/0005361 A1 * | 6/2001 | Lipsanen | 370/238 |

FOREIGN PATENT DOCUMENTS

| | | |
|---|---|---|
| EP | 0242117 | 10/1987 |
| GB | 2341041 | 3/2000 |
| JP | 11-127128 | 5/1999 |
| WO | 97/33396 | 9/1997 |
| WO | 98/35466 | 8/1998 |

OTHER PUBLICATIONS

Search Report, mailed Apr. 23, 2009, in corresponding British Patent Application No. GB0823670.5 (4 pp.).

* cited by examiner

*Primary Examiner* — David C. Payne
*Assistant Examiner* — Vineeta Panwalkar
(74) *Attorney, Agent, or Firm* — Staas & Halsey LLP

(57) ABSTRACT

A first communication apparatus receives, from a second communication apparatus, information indicating the number of relays from a first supplying apparatus to the second communication apparatus. The first communication apparatus receives, from a third communication apparatus, information indicating the number of relays from a second supplying apparatus to the third communication apparatus. The first communication apparatus transmits, to the third communication apparatus, information indicating the number of relays from the first supplying apparatus to the first communication apparatus. The first communication apparatus transmits, to the second communication apparatus, information indicating the number of relays from the second supplying apparatus to the first communication apparatus. The first communication apparatus selects the second communication apparatus, which has a smaller number of relays among the second and the third communication apparatuses. The first communication apparatus synchronizes a clock thereof with a clock of the second communication apparatus.

8 Claims, 12 Drawing Sheets

COMMUNICATION APPARATUS AND CONTROL METHOD

CROSS-REFERENCE TO RELATED APPLICATIONS

This application is based upon and claims the benefit of priority from the prior Japanese Patent Application No. 2008-136597, filed on May 26, 2008, the entire contents of which are incorporated herein by reference.

BACKGROUND OF THE INVENTION

1. Field of the Invention

The present invention relates to a communication apparatus that operates synchronized with a master clock, and a control method thereof.

2. Description of the Related Art

Synchronous digital hierarchy/synchronous optical networking (SDH/SONET) communication apparatuses follow a master clock in a station building and all the apparatuses transmit and receive data synchronized with each other, thereby ensuring data quality. Concerning the synchronization of clocks, each of the apparatuses synchronizes with a clock from an external clock supplying apparatus, or according to a synchronous status message (SSM) that indicates the quality level of the clock and is transmitted and received among the communication apparatuses. Thereby, a technique of selecting higher quality clocks is employed such as that described in Japanese Patent Application Laid-Open Publication No. H11-127128.

On the other hand, Ethernet (registered trademark) packet-network communication apparatuses primarily operate using an independent clock source. Recently, for Ethernet, a trend of realizing a synchronized network such as the synchronization of clocks among communication apparatuses and the execution of transmission and reception of an SSM to maintain data quality is occurring and has also suggested in various recommendations such as G.8261 and IEE1588.

A synchronous network of conventional communication apparatuses that are based on the SDH/SONET includes externally synchronized communication apparatuses that operate based on the timings of a master clock from a clock supplying apparatus and line synchronization communication apparatuses that operate based on the line timings from the externally synchronized communication apparatuses. Thereby, the entire SDH/SONET network is synchronized with the same clock source.

The externally synchronized communication apparatuses are connected to both ends of each of the line synchronization communication apparatuses. By forwarding an SSM using S1 byte, each of the line synchronization communication apparatuses selects the higher quality clock from among clocks supplied through plural supply paths. When trouble arises in one of the supply paths, each communication apparatus executes a clock source switching operation to switch the clock synchronizing the clock of the apparatus with a clock from another supply path.

In case the quality levels of the clocks from the supply paths are the same, a network manager determines in advance a preference for each of the supply paths and sets the determined preference in each communication apparatus to determine which communication apparatus will be selected as the clock source. Thus, when the quality levels of the clocks of the supply paths are the same, each communication apparatus automatically selects a clock source based on the preference determined in advance.

However, according to the conventional technique above, if plural communication apparatuses synchronize with a clock supplied from a single supply path and trouble occurs in the supply path, the communication apparatuses need to sequentially switch clock sources such that the communication apparatuses synchronize with a clock supplied from another supply path. Each communication apparatus operates using an internal self-running clock until the communication apparatus completes the switching of its clock source. Therefore, a problem arises in that the quality of the clock is degraded before the completion of the switching.

For example, in a case where the quality levels of the clocks of the supply paths are the same, when a predetermined supply path having a high quality is selected, all the communication apparatuses synchronize with the clock supplied from the predetermined supply path upon the occurrence of trouble. As described above, when numerous communication apparatuses synchronize with the clock supplied from one supply path, the clock-source switching operation of each communication apparatus takes time and the period during which the communication apparatus uses the self-running clock becomes long.

SUMMARY OF THE INVENTION

It is an object of the present invention to at least solve the above problems in the conventional technologies.

A communication apparatus according to another aspect of the present invention selects any one clock from among clocks supplied through plural from supplying apparatuses of a master clock and synchronizes a clock of the communication apparatus with the clock selected. The communication apparatus includes a receiving unit that receives information indicating a relay count on a path from a supplying apparatus to a first communication apparatus connected to the communication apparatus on a side of the supplying apparatus, the information being received for each of the paths from a plurality of the first communication apparatuses; and a synchronizing unit that, based on the information received by the receiving unit, synchronizes the clock of the communication apparatus with a clock of a first communication apparatus having the relay count of a small number among the first communication apparatuses.

A communication method according to another aspect of the present invention is a method of selecting any one clock from among clocks supplied through a plurality of paths from supplying apparatuses of a master clock and of synchronizing a clock of the communication apparatus with the clock selected. The communication apparatus method includes receiving information indicating a relay count on a path from a supplying apparatus to a first communication apparatus connected to the communication apparatus on a, side of the supplying apparatus, the information being received for each of the paths from a plurality of the first communication apparatuses; and synchronizing, based on the information received at the receiving, the clock of the communication apparatus with a clock of a first communication apparatus having the relay count of a small number among the first communication apparatuses.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
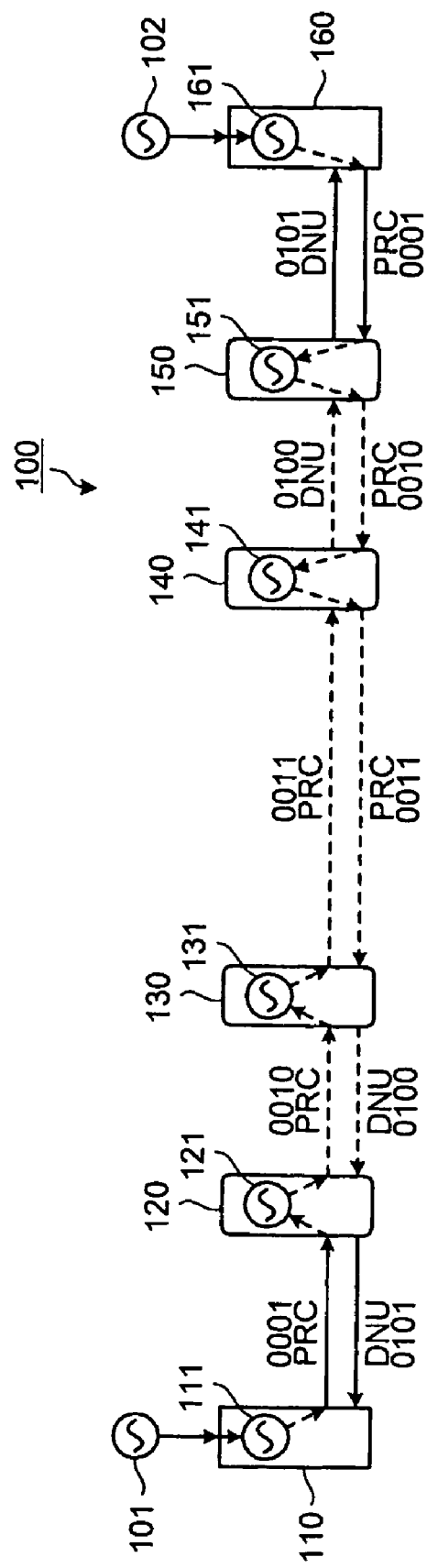
FIG. 1 is a block diagram of a communication system that includes a communication apparatus according to a first embodiment.

FIG. 1 is a block diagram of a communication system that includes a communication apparatus according to a first embodiment. As depicted in FIG. 1, a communication system 100 includes supplying apparatuses 101 and 102 and communication apparatuses 110, 120, 130, 140, 150, and 160. The supplying apparatuses 101 and 102 are synchronized with an external master clock and with each other. Clocks 111, 121, 131, 141, 151, and 161 represent clocks of the communication apparatuses 110, 120, 130, 140, 150, and 160, respectively.

The communication apparatuses 110, 120, 130, 140, 150, and 160 are connected in series. From among clocks supplied from master-clock supplying apparatuses through plural paths, each communication apparatus selects any one of the clocks and synchronizes its clock with the clock selected. The plural paths are paths respectively from the supplying apparatuses 101 and 102. The communication apparatuses communicate with each other being synchronized with each other.

The communication apparatus 110 is connected to the supplying apparatus 101 and the communication apparatus 120. The communication apparatus 120 is connected to the communication apparatuses 110 and 130. The communication apparatus 130 is connected to the communication apparatuses 120 and 140. The communication apparatus 140 is connected to communication apparatuses 130 and 150. The communication apparatus 150 is connected to communication apparatuses 140 and 160. The communication apparatus 160 is connected to communication apparatus 150 and the supplying apparatus 102.

Each communication apparatus selects any one of the apparatuses (the supplying apparatuses and the communication apparatuses) connected thereto as its clock source and synchronizes its clock with the clock of the apparatus selected. When selecting a clock source, each communication apparatus preferentially selects the apparatus having the clock of the highest quality level.

To compare the quality levels of the clocks, a given communication apparatus transmits, to the communication apparatuses connected to the given apparatus, information indicative of the quality level of the clock of the given apparatus. Likewise, the given apparatus receives, from each of the communication apparatuses connected to thereto, information indicative of the quality levels of the clocks of the communication apparatuses connected thereto.

More specifically, the communication apparatus 110 transmits information indicating the quality level of the clock 111 of the apparatus 110 to the communication apparatus 120. The communication apparatus 110 receives information indicating the quality level of the clock 121 of the communication apparatus 120 from the communication apparatus 120.

The communication apparatus 120 transmits information indicating the quality level of the clock 121 to each of the communication apparatuses 110 and 130. The communication apparatus 120 receives information indicating the quality level of the clock 111 of the communication apparatus 110 from the communication apparatus 110, and further receives information indicating the quality level of the clock 131 of the communication apparatus 130 from the communication apparatus 130.

The communication apparatus 130 transmits information indicating the quality level of the clock 131 to each of the communication apparatuses 120 and 140. The communication apparatus 130 receives information indicating the quality level of the clock 121 of the communication apparatus 120 from the communication apparatus 120, and further receives information indicating the quality level of the clock 141 of the communication apparatus 140 from the communication apparatus 140.

The communication apparatus 140 transmits information indicating the quality level of the clock 141 to each of the communication apparatuses 130 and 150. The communication apparatus 140 receives information indicating the quality level of the clock 131 of the communication apparatus 130 from the communication apparatus 130, and further receives information indicating the quality level of the clock 151 of the communication apparatus 150 from the communication apparatus 150.

The communication apparatus 150 transmits information indicating the quality level of the clock 151 to each of the communication apparatuses 140 and 160. The communication apparatus 150 receives information indicating the quality level of the clock 141 of the communication apparatus 140 from the communication apparatus 140, and further receives information indicating the quality level of the clock 161 of the communication apparatus 160 from the communication apparatus 160.

The communication apparatus 160 transmits information indicating the quality level of the clock 161 of the communication apparatus 160 to the communication apparatus 150. The communication apparatus 160 receives information indicating the quality level of the clock 151 of the communication apparatus 150 from the communication apparatus 150.

The information indicative of the quality level of a clock is transmitted and received as an SSM. In the embodiment, for simplicity, an SSM is information including three values of PRC, SEC, and DNU, where the PRC is the highest quality level and the DNU is the lowest quality level. The PRC is indicative of a state when the clock of a given communication apparatus and a clock supplied from the supplying apparatus 101 or 102 are synchronized.

The SEC is indicative of a state when the clock of a given communication apparatus and the clock supplied from the master clock are not synchronized and the given apparatus uses the self-running clock, or a state when the clock of the given apparatus and a self-running clock of another communication apparatus are synchronized. The DNU is transmitted as information indicating that the clock of a given apparatus is not selectable so that the clock is not selected by any communication apparatus regardless of the quality level of the clock.

When plural communication apparatuses, among the communication apparatuses connected to a given communication apparatus, each have a clock at the highest quality level thereamong, the given apparatus selects, as a clock source, the communication apparatus that has the smallest number of relays from the supplying apparatus 101 or 102. The number of relays of a communication apparatus connected to the given apparatus is the number of relays to the communication apparatus from a supplying apparatus on a side of the communication apparatus opposite to the given apparatus.

For example, assuming the given apparatus is the communication apparatus 120, the number of relays of the communication apparatus 110 is the number of relays to the communication apparatus 110 from the supplying apparatus 101 on a side of the communication apparatus 110 opposite to the communication apparatus 120. In this case, the number of relays includes only the communication apparatus 110 and hence, is one. The number of relays of the communication apparatus 130 is the number of relays to the communication apparatus 130 from the supplying apparatus 102 on a side of the communication apparatus 130 opposite to the communication apparatus 120. In this case, the number of relays of the communication apparatus 130 includes the communication apparatuses 160, 150, 140, and 130 and hence, totals 4.

To compare the number of relays of the communication apparatuses connected to a given communication apparatus, the given apparatus transmits, for each of the paths through which the master clock is supplied, information that indicates the number of relays from a supplying apparatus to the given apparatus. The given apparatus transmits the information, for a path through which a master clock is supplied, to a communication apparatus that is among the communication apparatuses connected to the given apparatus and is not the communication apparatus connected to the given apparatus on a side of the supplying apparatus supplying the master clock. And, for a path through which a master clock is supplied by a supplying apparatus, the given apparatus receives information that indicates the number of relays from the supplying apparatus to the communication apparatus connected to the given apparatus on the side of the supplying apparatus. The information is received from the communication apparatus connected to the given apparatus on the side of the supplying apparatus. In a similar manner, the information is received for each of the paths.

More specifically, the communication apparatus 110 transmits, to the communication apparatus 120, a sequence number (SN) "0001" indicating, in the binary notation, the number of relays to be "one" from the supplying apparatus 101 to the communication apparatus 110 on the path through which the clock is supplied from the supplying apparatus 101. The communication apparatus 110 receives from the communication apparatus 120 an SN "0101" indicating, in the binary notation, the number of relays to be "five" from the supplying apparatus 102 to the communication apparatus 120 on the path through which the clock is supplied from the supplying apparatus 102.

The communication apparatus 120 receives from the communication apparatus 110 the SN "0001" indicating, in binary notation, the number of relays to be "one" from the supplying apparatus 101 to the communication apparatus 110 on the path through which the clock is supplied from the supplying apparatus 101. For the same path, the communication apparatus 120 transmits to the communication apparatus 130 information indicating the number of relays to be "two" from the supplying apparatus 101 to the communication apparatus 120. In this case, the communication apparatus 120 adds one to the SN "0001" received from the communication apparatus 110 and transmits the result, an SN "0010", to the communication apparatus 130.

The communication apparatus 120 receives from the communication apparatus 130 an SN "0100" indicating, in binary notation, the number of relays to be "four" from the supplying apparatus 102 to the communication apparatus 130 on the path through which the clock is supplied from the supplying apparatus 102. For the same path, the communication apparatus 120 transmits to the communication apparatus 130 information indicating the number of relays to be "five" from the supplying apparatus 102 to the communication apparatus 120. In this case, the communication apparatus 120 adds one to the SN "0100" received from the communication apparatus 130 and transmits the result, an SN "0101", to the communication apparatus 110.

The communication apparatus 130 receives from the communication apparatus 120, the SN "0010" indicating in binary notation, the number of relays to be two from the supplying apparatus 101 to the communication apparatus 120 on the path through which the clock is supplied from the supplying apparatus 101. For the same path, the communication apparatus 130 transmits to the communication apparatus 140 information that indicates the number of relays to be three from the supplying apparatus 101 to the communication apparatus 130. In this case, the communication apparatus 130 adds one to the SN "0010" received from the communication apparatus 120 and transmits the result, an SN "0011", to the communication apparatus 140.

The communication apparatus 130 receives from the communication apparatus 140, an SN "0011" indicating in binary notation, the number of relays to be three from the supplying apparatus 102 to the communication apparatus 140 on the path through which the clock is supplied from the supplying apparatus 102. For the same path, the communication apparatus 130 transmits to the communication apparatus 120 information indicating the number of relays to be four from the supplying apparatus 102 to the communication apparatus 130. In this case, the communication apparatus 130 adds one to the SN "0011" received from the communication apparatus 140 and transmits the result, an SN "0100", to the communication apparatus 120.

The communication apparatus 140 receives from the communication apparatus 130, the SN "0011" indicating in binary notation; the number of relays to be three from the supplying apparatus 101 to the communication apparatus 130 on the path through which the clock is supplied from the supplying apparatus 101. For the same path, the communication apparatus 140 transmits to the communication apparatus 150 information indicating the number of relays to be four from the supplying apparatus 101 to the communication apparatus 140. In this case, the communication apparatus 140 adds one to the SN "0011" received from the communication apparatus 130 and transmits the result, an SN "0100", to the communication apparatus 150.

The communication apparatus 140 receives from the communication apparatus 150, an SN "0010" indicating in binary notation, the number of relays to be two from the supplying apparatus 102 to the communication apparatus 150 on the path through which the clock is supplied from the supplying apparatus 102. For the same path, the communication apparatus 140 transmits to the communication apparatus 130 information indicating the number of relays to be three from the supplying apparatus 102 to the communication apparatus 140. In this case, the communication apparatus 140 adds one to the SN "0010" received from the communication apparatus 150 and transmits the result, an SN "0011", to the communication apparatus 130.

The communication apparatus 150 receives from the communication apparatus 140, the SN "0100" indicating in binary notation, the number of relays to be four from the supplying apparatus 101 to the communication apparatus 140 on the path through which the clock is supplied from the supplying apparatus 101. For the same path, the communication apparatus 150 transmits to the communication apparatus 160 information indicating the number of relays to be five from the supplying apparatus 101 to the communication apparatus 150. In this case, the communication apparatus 150 adds one to the SN "0100" received from the communication apparatus 140 and transmits the result, an SN "0101", to the communication apparatus 160.

The communication apparatus 150 receives from the communication apparatus 160, an SN "0001" indicating in binary notation, the number of relays to be one from the supplying apparatus 102 to the communication apparatus 160 on the path through which the clock is supplied from the supplying apparatus 102. For the same path, the communication apparatus 150 transmits to the communication apparatus 140 information indicating the number of relays to be two from the supplying apparatus 102 to the communication apparatus 150. In this case, the communication apparatus 150 adds one to the SN "0001" received from the communication apparatus 160 and transmits the result, an SN "0010", to the communication apparatus 140.

The communication apparatus 160 receives from the communication apparatus 150, the SN "0101" indicating in binary notation, the number of relays to be "five" from the supplying apparatus 101 to the communication apparatus 150 for the path through which the clock is supplied from the supplying apparatus 101. The communication apparatus 160 transmits to the communication apparatus 150, the SN "0001" indicating in binary notation, the number of relays to be "one" from the supplying apparatus 102 to the communication apparatus 160 for the path through which the clock is supplied from the supplying apparatus 102.

It is assumed that in the initial state of the communication system 100, no trouble occurs among the supplying apparatuses 101 and 102 and the communication apparatuses. The communication apparatuses first transmit and receive the SNs above according to the respective connection relations. In this case, each communication apparatus regards the quality level of all the clocks to be the same and selects a clock source by comparing the SNs.

However, the communication apparatus 110 selects the supplying apparatus 101 directly connected thereto as a clock source and synchronizes the clock 111 to the clock supplied from the supplying apparatus 101. Subsequently, because the clock 111 synchronizes with the clock supplied from the supplying apparatus 101, the communication apparatus 110 transmits the PRC to the communication apparatus 120 as the SSM.

The communication apparatus 160 selects the supplying apparatus 102 directly connected thereto as a clock source and synchronizes the clock 161 to the clock supplied from the supplying apparatus 102. Subsequently, because the clock 161 synchronizes with the clock supplied from the supplying apparatus 102, the communication apparatus 160 transmits the PRC to the communication apparatus 150 as the SSM.

The communication apparatus 120 selects, as a clock source, the communication apparatus 110 that has transmitted the smaller SN "0001" among the communication apparatuses 110 and 120 connected to the communication apparatus 120. The communication apparatus 120 synchronizes the clock 121 thereof to the clock 111 of the communication apparatus 110. Subsequently, as the clock 121 is synchronized with the clock from the supplying apparatus 101, the communication apparatus 120 transmits the PRC to the communication apparatus 130 as the SSM.

The communication apparatus 120 transmits the DNU as the SSM to the communication apparatus 110 selected as the clock source. Thereby, looping of the clock caused by the communication apparatus 110 selecting the communication apparatus 120 as a clock source can be prevented.

The communication apparatus 130 selects, as a clock source, the communication apparatus 120 that has transmitted the smaller SN "0010" among the communication apparatuses 120 and 140 connected to the communication apparatus 130. The communication apparatus 130 synchronizes the clock 131 thereof to the clock 121 of the communication apparatus 120. Subsequently, as the clock 131 of the communication apparatus 130 is synchronized with the clock from the supplying apparatus 101, the communication apparatus 130 transmits the PRC to the communication apparatus 140 as the SSM.

The communication apparatus 130 transmits the DNU as the SSM to the communication apparatus 120 selected as the clock source. Thereby, looping of the clock caused by the communication apparatus 120 selecting the communication apparatus 130 as a clock source can be prevented.

The communication apparatus 140 selects, as a clock source, the communication apparatus 150 that has transmitted the smaller SN "0010" among the communication apparatuses 130 and 150 connected to the communication apparatus 140. The communication apparatus 140 synchronizes the clock 141 thereof to the clock 151 of the communication apparatus 150. Subsequently, as the clock 141 of the communication apparatus 140 is synchronized with the clock from the supplying apparatus 102, the communication apparatus 140 transmits the PRC to the communication apparatus 130 as the SSM.

The communication apparatus 140 transmits the DNU as the SSM to the communication apparatus 150 selected as the clock source. Thereby, looping of the clock caused by the communication apparatus 150 selecting the communication apparatus 140 as a clock source can be prevented.

The communication apparatus 150 selects, as a clock source, the communication apparatus 160 that has transmitted the smaller SN "0001" among the communication apparatuses 140 and 160 connected to the communication apparatus 150. The communication apparatus 150 synchronizes the clock 151 thereof to the clock 161 of the communication apparatus 160. Subsequently, as the clock 151 of the communication apparatus 150 is synchronized with the clock from the supplying apparatus 102, the communication apparatus 150 transmits the PRC to the communication apparatus 140 as the SSM.

The communication apparatus 150 transmits the DNU as the SSM to the communication apparatus 160 selected as the clock source. Thereby, looping of the clock caused by the communication apparatus 160 selecting the communication apparatus 150 as a clock source can be prevented.

Thereby, each of the clocks of the communication apparatuses 110, 120, and 130 become synchronized with the clock supplied from the supplying apparatus 101. Each of the clocks of the communication apparatuses 140, 150, and 160 become synchronized with the clock supplied from the supplying apparatus 102. An example in which trouble has occurred in the path from the communication apparatus 110 to the communication apparatus 120 is described.

Figure 2:
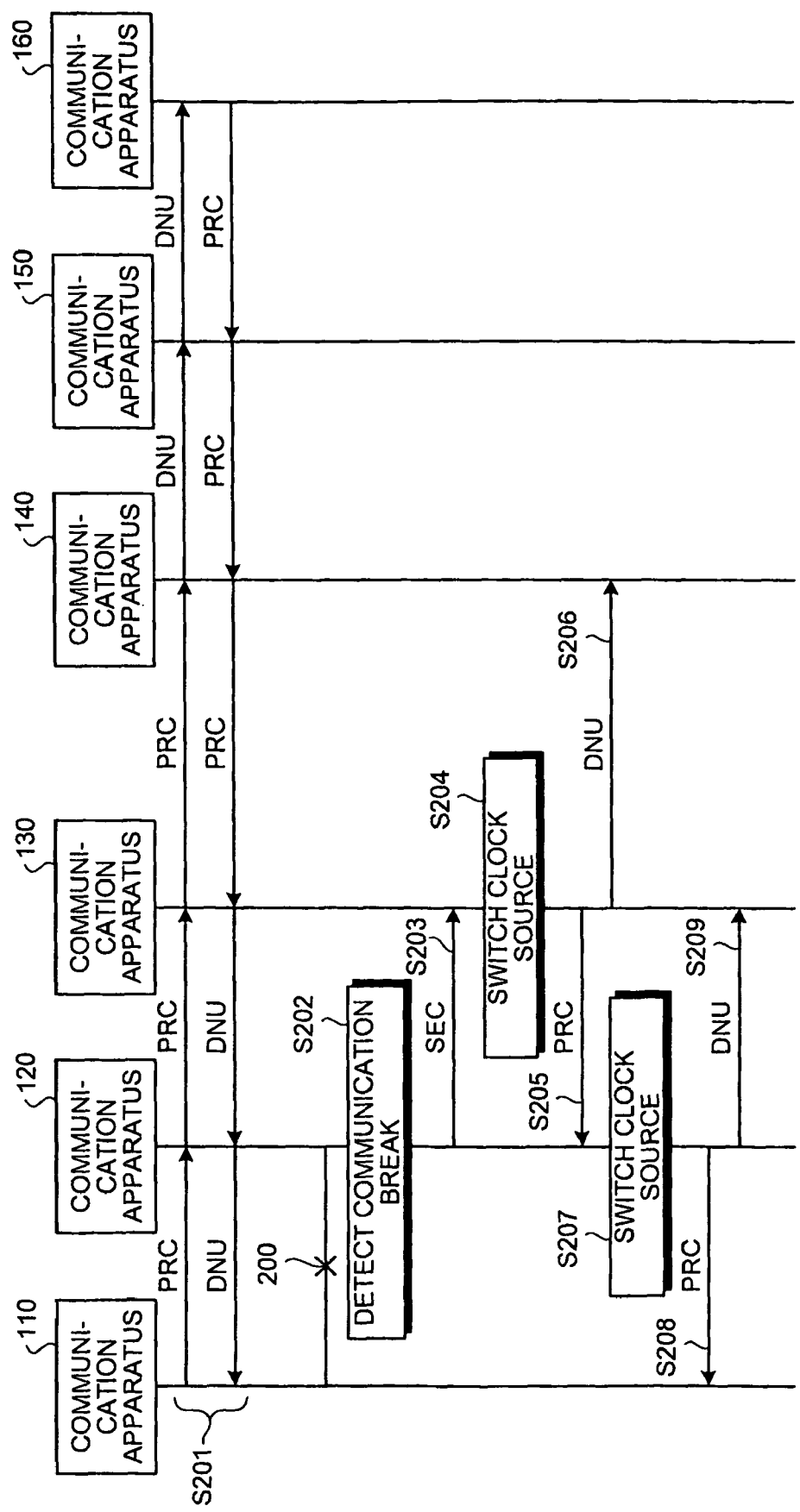
FIG. 2 is a sequencing chart of an example of operations executed when trouble occurs in the communication system depicted in FIG. 1.

FIG. 2 is a sequencing chart of an example of operations executed when trouble occurs in the communication system depicted in FIG. 1. As depicted in FIG. 2, it is first assumed that the communication apparatuses transmit and receive SSMs to/from each other as depicted in FIG. 1 (step S201). It is then assumed that trouble 200 has occurred on the path from the communication apparatus 110 to the communication apparatus 120. In response, the communication apparatus 120 detects a break in the communication with the communication apparatus 110 (step S202).

In this case, the communication apparatus 120 becomes unable to acquire the clock of the communication apparatus 110 and, because the DNU is transmitted as the SSM from the communication apparatus 130, the apparatus 120 is also unable to select the communication apparatus 130 as a clock source. Therefore, the communication apparatus 120 switches the clock 121 thereof to the self-running clock and transmits the SEC to the communication apparatus 130 as the SSM (step S203).

Because the SSM (PRC) transmitted from the communication apparatus 140 has a higher value than that of the SSM (SEC) transmitted from the communication apparatus 120, the communication apparatus 130 switches the clock source thereof to the communication apparatus 140 (step S204). That is, the communication apparatus 130 synchronizes the clock 131 thereof with the clock 141 of the communication apparatus 140.

Because the clock 131 of the communication apparatus 130 becomes synchronized with the clock supplied from the supplying apparatus 102, the communication apparatus 130 transmits the PRC to the communication apparatus 120 as the SSM (step S205). The communication apparatus 130, selecting the communication apparatus 140 as a clock source, transmits the DNU to the communication apparatus 140 as the SSM to prevent looping of the clock caused by the communication apparatus 140 selecting the communication apparatus 130 as a clock source (step S206).

Because the communication apparatus 120 is not able to acquire the clock of the communication apparatus 110 and the communication apparatus 130 transmits the PRC as the SSM, the communication apparatus 120 switches the clock source thereof to the communication apparatus 130 (step S207). That is, the communication apparatus 120 synchronizes the clock 131 of the communication apparatus 130 with the clock 121.

Because the clock 121 of the communication apparatus 120 becomes synchronized with the clock supplied from the supplying apparatus 102, the communication apparatus 120 transmits the PRC to the communication apparatus 110 as the SSM (step S208). The communication apparatus 120, selecting the communication apparatus 130 as a clock source, transmits the DNU to the communication apparatus 130 as the SSM to prevent looping of the clock caused by the communication apparatus 130 selecting the communication apparatus 120 as a clock source (step S209).

Through an execution of the steps above, a series of operations executed by the communication system 100 when the trouble occurs comes to an end. In this manner, the number of the operations executed to switch the clock source when the trouble occurs can be minimized by the clock of each communication apparatus being synchronized with the clock supplied from the supplying apparatus 101, 102 for which the number of relays from the supplying apparatus is a small number.

As conventionally executed, in the state where all the communication apparatuses are synchronized with the clock supplied from the supplying apparatus 101, when the trouble 200 has occurred, the transmission of the SSM described at step S203 is sequentially executed for the communication apparatuses 120 to 160 and, thereafter, the switching of the clock source described at steps S204 to 208 is sequentially executed for the communication apparatuses 160 to 110.

Whereas, in the communication system 100, as described in the steps above, the transmission of the SEC needs to be executed only once and the switching operation of the clock source can be limited to only the communication apparatuses 110, 120, and 130. Therefore, the time period during which the clock of each communication apparatus is the self-running clock can be reduced. The communication apparatuses 140, 150, and 160 need not execute any operation against the trouble 200.

Figure 3:
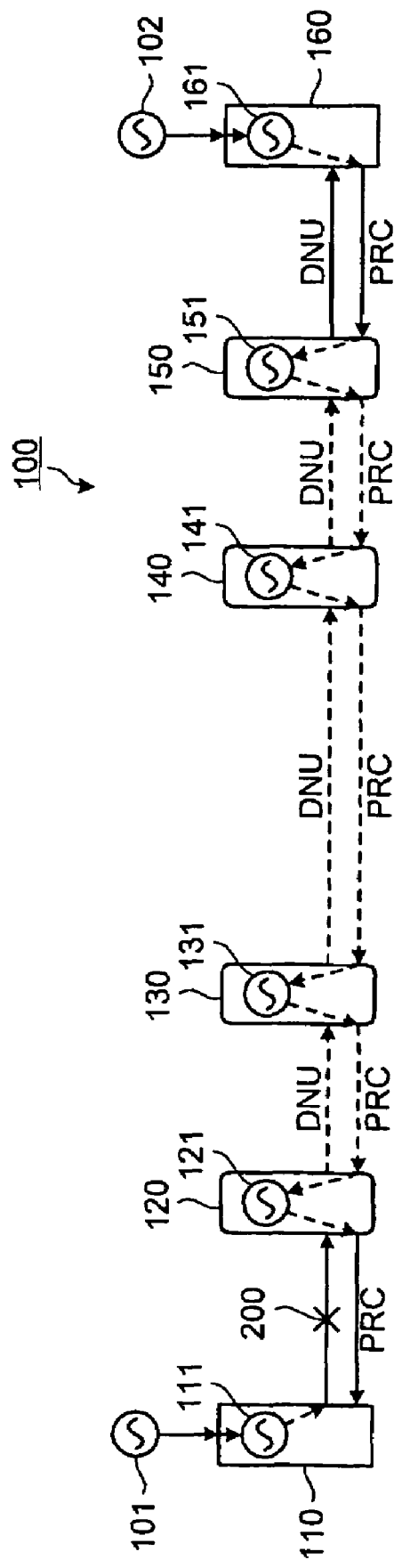
FIG. 3 is a block diagram of the communication system after the operations depicted in FIG. 2.

FIG. 3 is a block diagram of the communication system after the operations depicted in FIG. 2. After the operations depicted in FIG. 2, the clock 111 of the communication apparatus 110 remains synchronized with the clock supplied from the supplying apparatus 101. The clocks of each of the communication apparatuses 140, 150, and 160 remain synchronized with the clock supplied from the supplying apparatus 102.

The state of the clocks of the communication apparatuses 120 and 130 varies between states where the clocks of the communication apparatuses 120 and 130 are synchronized with the clock supplied from the supplying apparatus 101 (see FIG. 1) to where the clocks are synchronized with the clock supplied from the supplying apparatus 102.

Though not depicted, when the trouble 200 is cleared, the communication apparatus 110 transmits the PRC to the communication apparatus 120 and the communication apparatus 120 returns the clock source thereof to the communication apparatus 110. The communication apparatus 120 transmits the PRC to the communication apparatus 130 and the communication apparatus 130 returns the clock source thereof to the communication apparatus 120. Thereby, the state of the communication system 100 returns to that depicted in FIG. 1.

Figure 4:
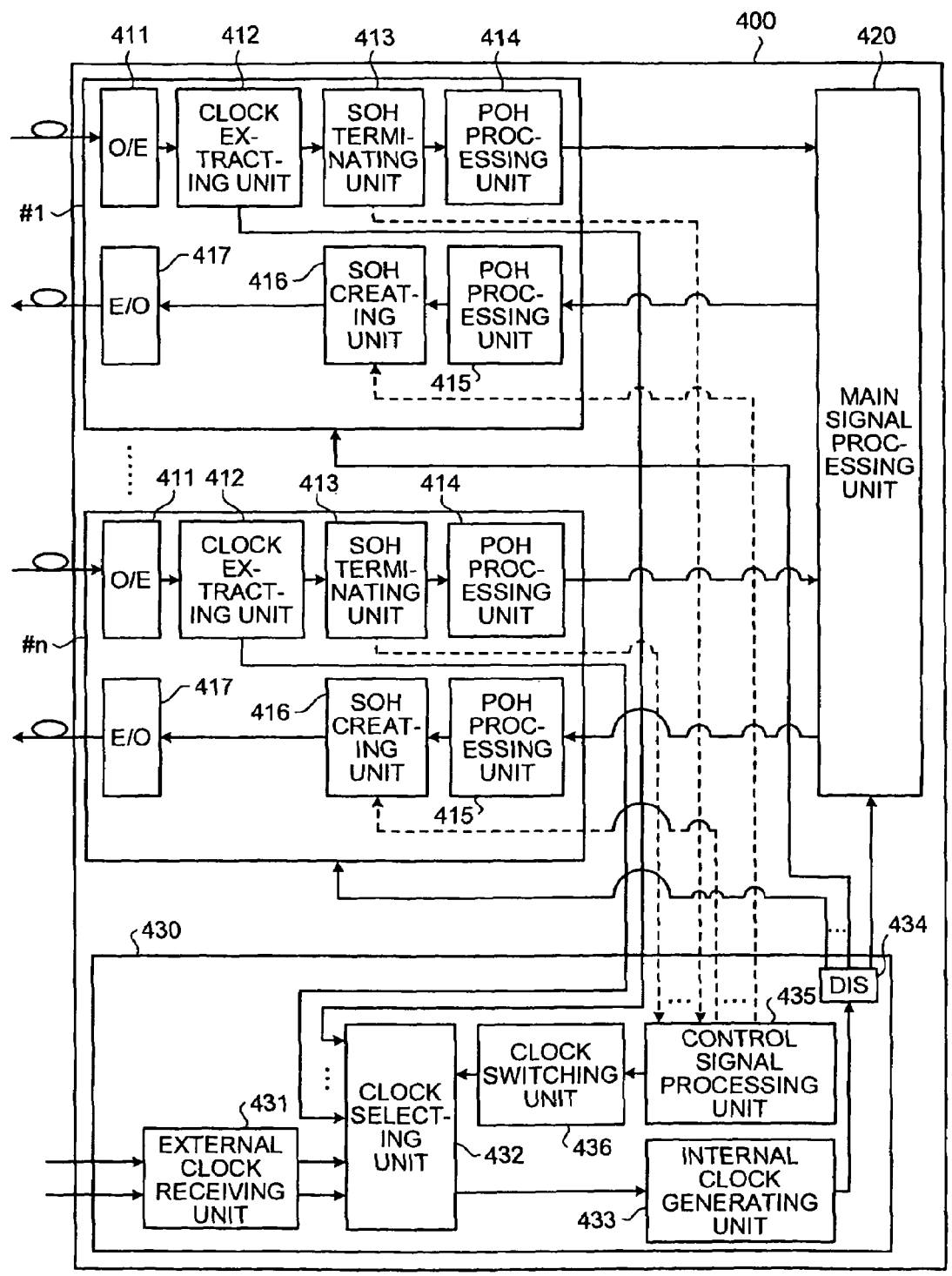
FIG. 4 is a block diagram of an example of the configuration of the communication apparatus depicted in FIG. 1.

FIG. 4 is a block diagram of an example of the configuration of the communication apparatus depicted in FIG. 1. The case will be described herein where the communication system 100 is a SONET/SDH network. A communication apparatus 400 depicted in FIG. 4 is one of the communication apparatuses depicted in FIG. 1. A communication apparatus 400 includes n interface units #1 to #n, a main signal processing unit 420, and a clock processing unit 430. "n" is the number of the communication apparatuses connected to the communication apparatus 400.

For example, when the communication apparatus 400 is the communication apparatus 110 or 160, n is one. When the communication apparatus 400 is the communication apparatus 120, 130, 140, or 150, n is two. When a communication apparatus not depicted is further connected to each communication apparatus depicted in FIG. 1, n is three or more.

Each of the interface units #1 to #n operates with the clock output from the clock processing unit 430. Each of the interface units #1 to #n includes an optical-electric (O/E) converting unit 411, a clock extracting unit 412, an SOH terminating unit 413, a POH processing unit 414, a POH processing unit 415, an SOH creating unit 416, and an electric-optical (E/O) converting unit 417. The optical-electric converting unit 411 receives a signal that is transmitted from another communication apparatus through a transmission path.

The optical-electric converting unit 411 converts received light into an electrical signal and outputs the electrical signal to the clock extracting unit 412. The clock extracting unit 412 outputs the signal output from the optical-electric converting unit 411 to the SOH terminating unit 413. The clock extracting unit 412 extracts the clock from the signal output from the optical-electric converting unit 411 and outputs the extracted clock to the clock processing unit 430.

The SOH terminating unit 413 outputs the signal output from the clock extracting unit 412 to the POH processing unit 414. The SOH terminating unit 413 obtains the SSM and the SN included in an SOH overhead (for example, S1) of the signal output from the clock extracting unit 412. The SOH terminating unit 413 outputs the obtained SSM and the SN to the clock processing unit 430.

The POH processing unit 414 executes a path overhead (POH) process, such as parity calculation, on the signal output from the SOH terminating unit 413 and outputs the signal to the main signal processing unit 420. The POH processing unit 415 executes the POH process on the signal output from the main signal processing unit 420 and outputs the signal to the SOH creating unit 416.

The SOH creating unit 416 stores the SSM and the SN output from the clock processing unit 430 into a section overhead (SOH) (for example, S1) of the signal output from the POH processing unit 415. The SOH creating unit 416 outputs the signal that stores therein the SSM and the SN to the electric-optical converting unit 417. The electric-optical converting unit 417 converts the signal output from the SOH creating unit 416 into an optical signal and transmits the optical signal to another communication apparatus through a transmission path.

The main signal processing unit 420 aggregates the signals output from the interface units #1 to #n and executes main signal processing such as a switching function. The main signal processing process that the main signal processing unit 420 executes is a process such as a path switching function, a cross connecting function, an ADD/DROP function, and a multiplexing/de-multiplexing function that are executed in transmitting apparatuses in general. The main signal processing unit 420 operates with the clock output from the clock processing unit 430.

The clock processing unit 430 includes an external clock receiving unit 431, a clock selecting unit 432, an internal clock generating unit 433, and a branching unit 434 (DIS), a control signal processing unit 435, and a clock switching unit 436.

The external clock receiving unit 431 is a component that is provided when the communication apparatus 400 is a communication apparatus that is directly connected to the supplying apparatus 101 or 102 (the communication apparatus 110 or 160). The external clock receiving unit 431 receives the clock supplied from the supplying apparatus that is connected to the communication apparatus 400 and outputs the clock to the clock selecting unit 432.

The clock selecting unit 432 receives the clocks output from the clock extracting units 412 of the interface units #1 to #n, and the clock output from the external clock receiving unit 431 (only when the external clock receiving unit 431 is provided). The clock selecting unit 432 selects any one of the clocks according to the control of the clock switching unit 436, and outputs the selected clock to the internal clock generating unit 433.

The internal clock generating unit 433 generates, using the clock output from the clock selecting unit 432 as a master, a clock to be used internally by the apparatus and outputs the generated clock to the branching unit 434. When no clock is output from the clock selecting unit 432, the internal clock generating unit 433 generates a self-running clock and outputs this clock to the branching unit 434. The branching unit 434 branches the clock output from the internal clock generating unit 433 and outputs the branched clocks to each of the interface units #1 to #n and the main signal processing unit 420.

The control signal processing unit 435 determines an apparatus to be the clock source for the communication apparatus 400 based on the SSM and the SN output from the SOH terminating unit 413 of each of the interface units #1 to #n. The control signal processing unit 435 outputs information indicating the determined apparatus to the clock switching unit 436. The control signal processing unit 435 outputs the DNU as the SSM to the interface unit that is connected to the determined apparatus of the interface units #1 to #n.

The control signal processing unit 435 outputs the SSM received from the determined apparatus to the interface unit that is connected to an apparatus that is not the determined apparatus among the interface units #1 to #n. When no apparatus is present that is selectable as the clock source for the communication apparatus 400, the control signal processing unit 435 outputs information indicative of such to the clock switching unit 436.

The clock switching unit 436 controls the clock control unit 432 such that the clock selecting unit 432 selects the clock of the apparatus indicated by the information output from the control signal processing unit 435. When information indicating that no apparatus is present that is selectable as the clock source of the communication apparatus 400 is output from the control signal processing unit 435, the clock switching unit 436 controls the clock selecting unit 432 such that the clock selecting unit 432 outputs no clock.

Figure 5:
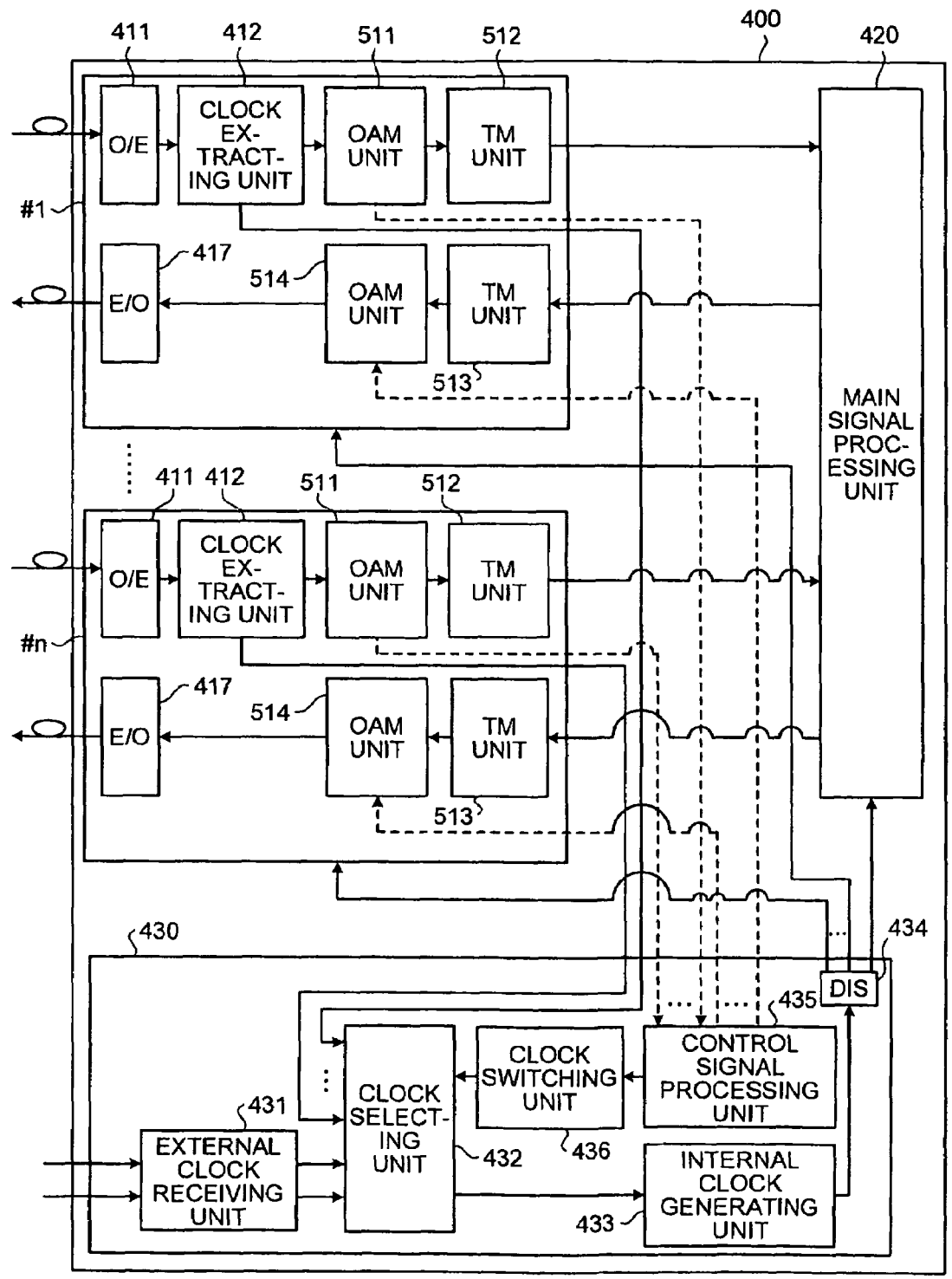
FIG. 5 is a block diagram of another example of the configuration of the communication apparatus depicted in FIG. 1.

FIG. 5 is a block diagram of another example of the configuration of the communication apparatus depicted in FIG. 1. In FIG. 5, components identical to those depicted in FIG. 4 are given identical reference numerals and the description thereof is omitted. A case in which the communication system 100 is a packet network is described. Each of the interface units #1 to #n of the communication apparatus 400 includes an OAM unit 511, a TM unit 512, a TM unit 513, and an OAM unit 514 in place of the SOH terminating unit 413, the POH processing unit 414, the POH processing unit 415, and the SOH creating unit 416 depicted in FIG. 4.

The OAM unit 511 outputs to the TM unit 512 a packet signal output from the clock extracting unit 412. The OAM unit 511 executes an operation, administration, and maintenance (OAM) process on the packet signal output from the clock extracting unit 412, and acquires a packet signal that has the SSM and the SN stored therein. The OAM unit 511 outputs to the clock processing unit 430, the SSM and the SN stored in the acquired packet signal.

The TM unit 512 executes a packet signal process on the packet signal output from the OAM unit 511 and outputs to the main signal processing unit 420, the signal on which the packet signal process has been executed. The TM unit 513 executes the packet signal process on the signal output from the signal processing unit and outputs to the OAM unit 514, the packet signal on which the packet signal process has been executed.

The OAM unit 514 executes the OAM process on the packet signal output from the TM unit 513. The OAM unit 514 outputs to the electric-optical converting unit 417, the packet signal output from the TM unit 513. The OAM unit 514 stores the SSM and the SM output from the clock processing unit 430 into the packet signal and outputs the packet signal having the SSM and the SN stored therein to the electric-optical converting unit 417.

Figure 6:
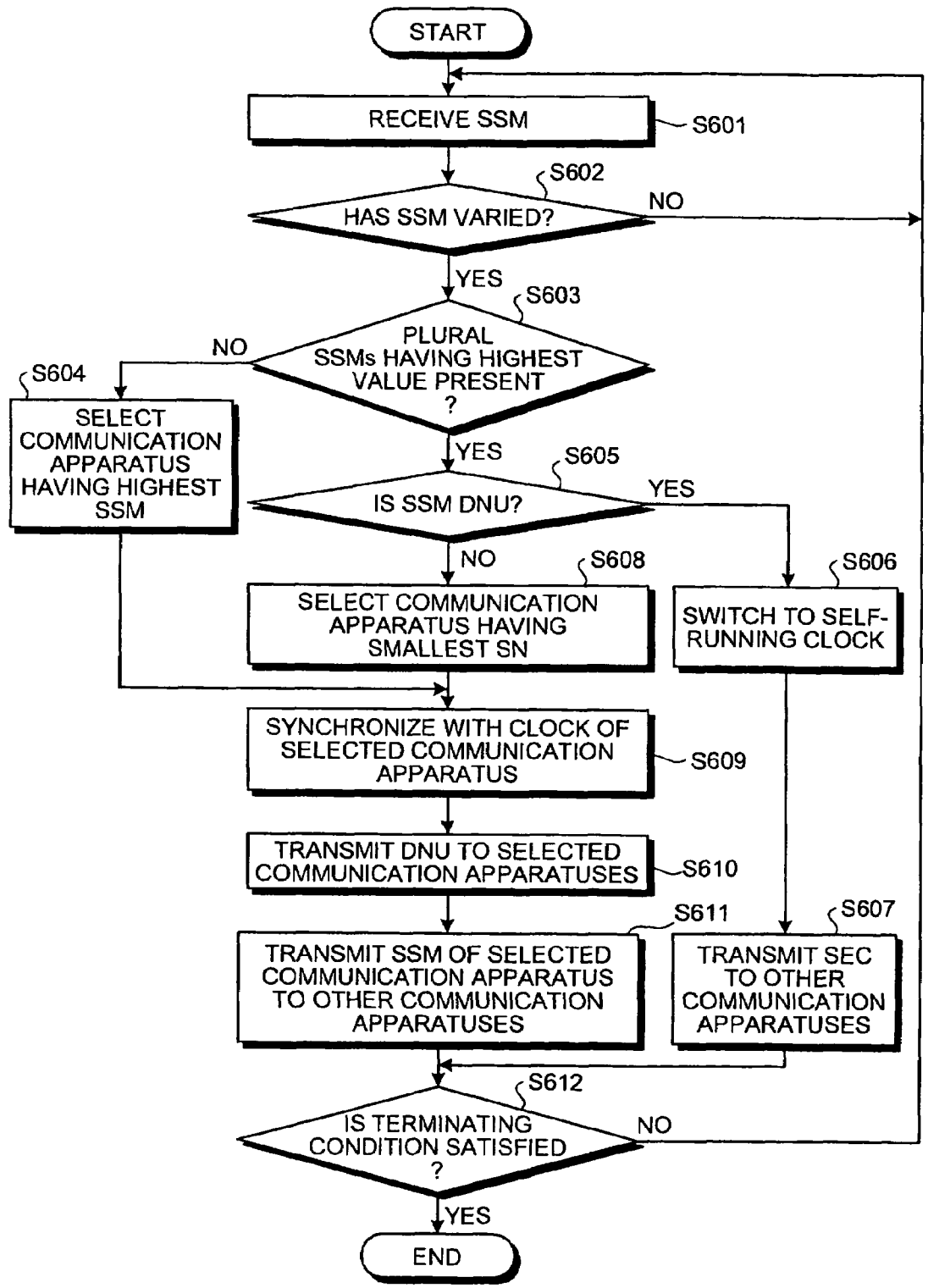
FIG. 6 is a flowchart of an example of operations of the communication apparatus depicted in FIG. 1.

FIG. 6 is a flowchart of an example of the operations of the communication apparatus depicted in FIG. 1. This example is based on the premise that the communication apparatuses transmit and receive the SNs to/from each other (see FIG. 1). As depicted in FIG. 6, a given communication apparatus receives the SSMs transmitted from the communication apparatuses that are connected to the given apparatus (step S601). Whether any of the SSMs received at step S601 has varied since being received last is determined (step S602).

At step S602, when none of the SSMs has varied (step S602: NO), the process returns to step S601 and continues. When any one of the SSMs has varied (step S602: YES), whether the highest value among the SSMs received at step S601 is held by plural SSMs is determined (step S603).

At step S603, when the highest value among the SSMs received at step S601 is held by only one SSM (step S603: NO), the communication apparatus that has transmitted the SSM having the highest value is selected as the clock source (step S604) and the process proceeds to step S609 and continues. When plural SSMs have the highest value (step S603: YES), for each of the SSMs, whether the SSM is the DNU is determined (step S605).

At step S605, when each of the SSMs having the highest value is the DNU (step S605: YES), the given apparatus switches its clock to the self-running clock (step S606) and transmits the SEC as the SSM to each of the communication apparatuses connected to the apparatus (step S607), and the process proceeds to step S612 and continues.

At step S605, when the SSMs having the highest value are not the DNU (step S605: NO), the given apparatus selects, as a clock source, the communication apparatus that has transmitted the smallest SN among the communication apparatuses have transmitted the SSMs having the highest value (step S608). The given apparatus synchronizes its clock to the clock of the communication apparatus selected as the clock source at step S604 or S608 (step S609).

The given apparatus transmits the DNU as the SSM to the communication apparatus selected at step S604 or S608 (step S610). The given apparatus transmits the SSM of the selected communication apparatus to a communication apparatus that is not the communication apparatus selected at step S604 or S608 and among the communication apparatuses connected to the apparatus (step S611).

Whether a terminating condition is satisfied is determined (step S612). For example, whether an ending command has been received from a user is determined. When the terminating condition is not satisfied (step S612: NO), the process returns to step S601 and continues. When the terminating condition is satisfied (step S612: YES), the series of operations come to an end.

According to the communication apparatus of the first embodiment, even when trouble has occurred in the supply path of the clock, the number of the communication apparatuses affected by the trouble can be reduced by selecting the clock source such that the number of relays from the supplying apparatus is small. Therefore, execution of the switching operation of the clock source against the trouble can be performed quickly among the least number of communication apparatuses.

Therefore, the time for switching the clock source can be reduced and the quality of the clock when trouble occurs can be improved. By selecting a clock source such that the number of relays from the supplying apparatus is small, the clock with which the communication apparatuses synchronize becomes distributable among clocks of plural communication apparatuses. Therefore, risks associated with the occurrence of trouble become distributed.

Because the number of communication apparatuses that execute no switching operation of respective clock sources against the occurrence of trouble increases, the amount of data to be transmitted and received, and the amount of processing as a whole for the switching operations of clock sources among the communication apparatuses can be reduced. Therefore, the performance of the communication system including the communication apparatuses during the occurrence of the trouble can be improved.

As the clock having a small number of relays from the supplying apparatus is less degraded, the quality of the clock used by each communication apparatus can be improved. By selecting a clock source based on the number of relays from a supplying apparatus when the quality level of clocks is the same, the conditions for selecting a clock source that a manager sets in each communication apparatus can be simplified.

Figure 7:
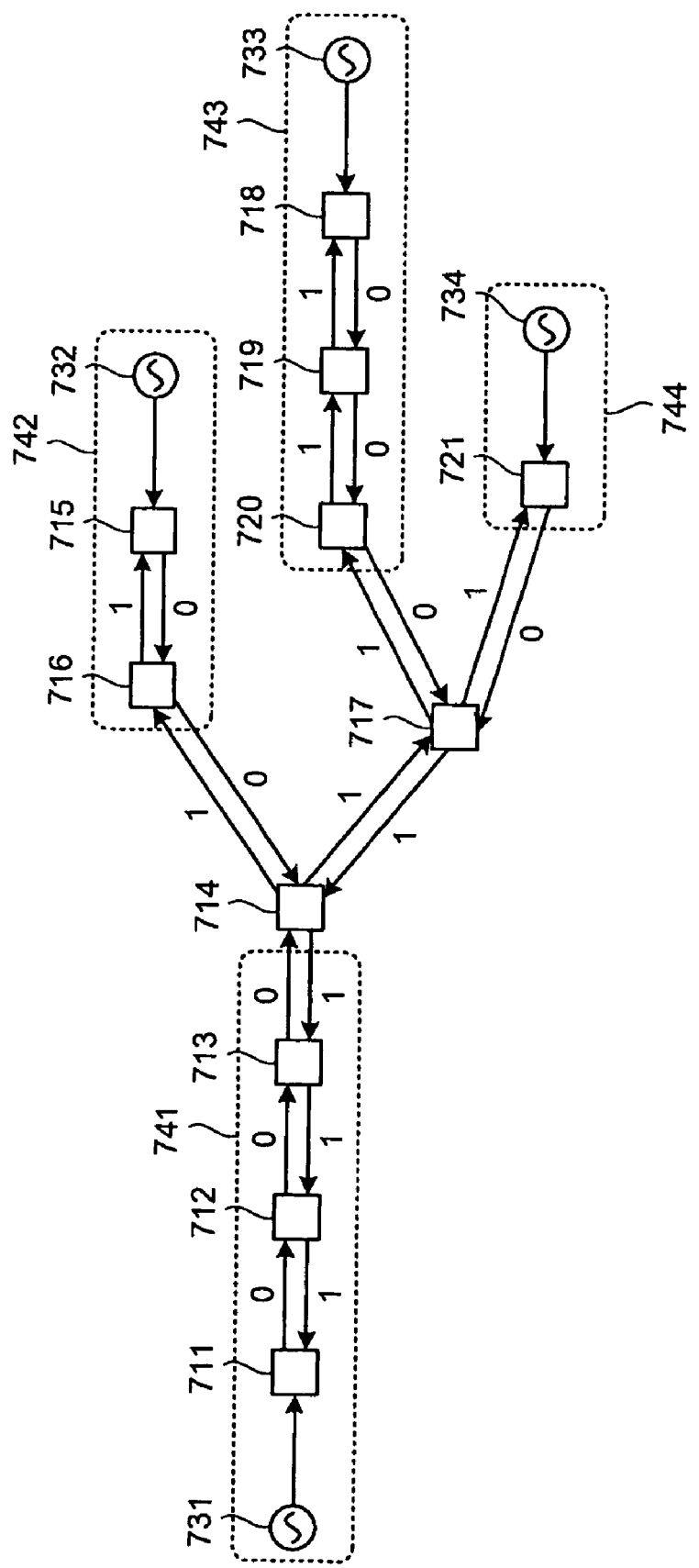
FIG. 7 is a diagram of a communication system according to a second embodiment.

FIG. 7 is a diagram of a communication system according to a second embodiment. The communication system 100 according to the second embodiment includes branching communication apparatuses to which clocks are supplied through three or more paths. In this case, communication apparatuses 714 and 717 are the branching communication apparatuses. Communication apparatuses 711 to 713 are connected in series.

The communication apparatus 711 is connected to a supplying apparatus 731 of a master clock. The communication apparatus 713 is connected to the communication apparatus 714 that is the branching communication apparatus. A communication apparatus 715 is connected to a communication apparatus 716, and a supplying apparatus 732 of a master clock. The communication apparatus 716 is connected to the communication apparatus 714 that is the branching communication apparatus.

Communication apparatuses 718 to 720 are connected in series. The communication apparatus 718 is connected to a supplying apparatus 733 of a master clock. The communication apparatus 720 is connected to the communication apparatus 717 that is the branching communication apparatus. A communication apparatus 721 is connected to a supplying apparatus 734 of a master clock and the communication apparatus 717. The communication apparatus 717 is connected to the communication apparatus 714.

Because the path from the supplying apparatus 731 to the communication apparatus 713 passes through no branching communication apparatus, each of the communication apparatuses 711 to 713 included in this path transmits a branching bit "0" to the communication apparatus connected thereto on a side opposite to the supplying apparatus 731. Because the path from the supplying apparatus 732 to the communication apparatus 716 passes through no branching communication apparatus, each of the communication apparatuses 715 and 716 included in this path transmits the branching bit "0" to the communication apparatus connected thereto on a side opposite to the supplying apparatus 732.

Because the path from the supplying apparatus 733 to the communication apparatus 720 passes through no branching communication apparatus, each of the communication apparatuses 718 to 720 included in this path transmits the branching bit "0" to the communication apparatus connected thereto on a side opposite to the supplying apparatus 733. Because the path from the supplying apparatus 734 to the communication apparatus 721 passes through no branching communication apparatus, the communication apparatus 721 included in this path transmits the branching bit "0" to the communication apparatus 717 connected thereto on a side opposite to the supplying apparatus 734.

Because the path from the communication apparatus 714 that is a branching communication apparatus to the communication apparatus 711 passes through the branching communication apparatus, each of the communication apparatuses 711 to 713 included in this path transmits the branching bit "1" to the communication apparatuses connected thereto on a side opposite to the communication apparatus 714. Because the path from the communication apparatus 714 to the communication apparatus 715 passes through the branching communication apparatus, each of the communication apparatuses 715 and 716 included in this path transmits the branching bit "1" to the communication apparatus connected thereto on a side opposite to the communication apparatus 714.

Because the path from the communication apparatus 717 that is a branching communication apparatus to the communication apparatus 718 passes through the branching communication apparatus, each of the communication apparatuses 718 to 720 included in this path transmits the branching bit "1" to the communication apparatus connected thereto on a side opposite to the communication apparatus 717. Because a bilateral path between the communication apparatus 714 that is a branching communication apparatus and the communication apparatus 717 passes through the branching communication apparatuses, the communication apparatuses 714 and 717 each transmit the branching bit "1" to each other.

Each communication apparatus preferentially selects, as a clock source, a communication apparatus that has transmitted thereto the branching bit "0". In this case, as indicated by a dotted line frame 741, the respective clocks of the communication apparatuses 711 to 713 are synchronized with the clock supplied from the supplying apparatus 731.

As indicated by a dotted line frame 742, the respective clocks of the communication apparatuses 715 and 716 are synchronized with the clock supplied from the supplying apparatus 732. As indicated by a dotted line frame 743, the respective clocks of the communication apparatuses 718 to 720 are synchronized with the clock supplied from the supplying apparatus 733. As indicated by a dotted line frame 744, the clock of the communication apparatus 721 is synchronized with the clock supplied from the supplying apparatus 734.

Figure 8:
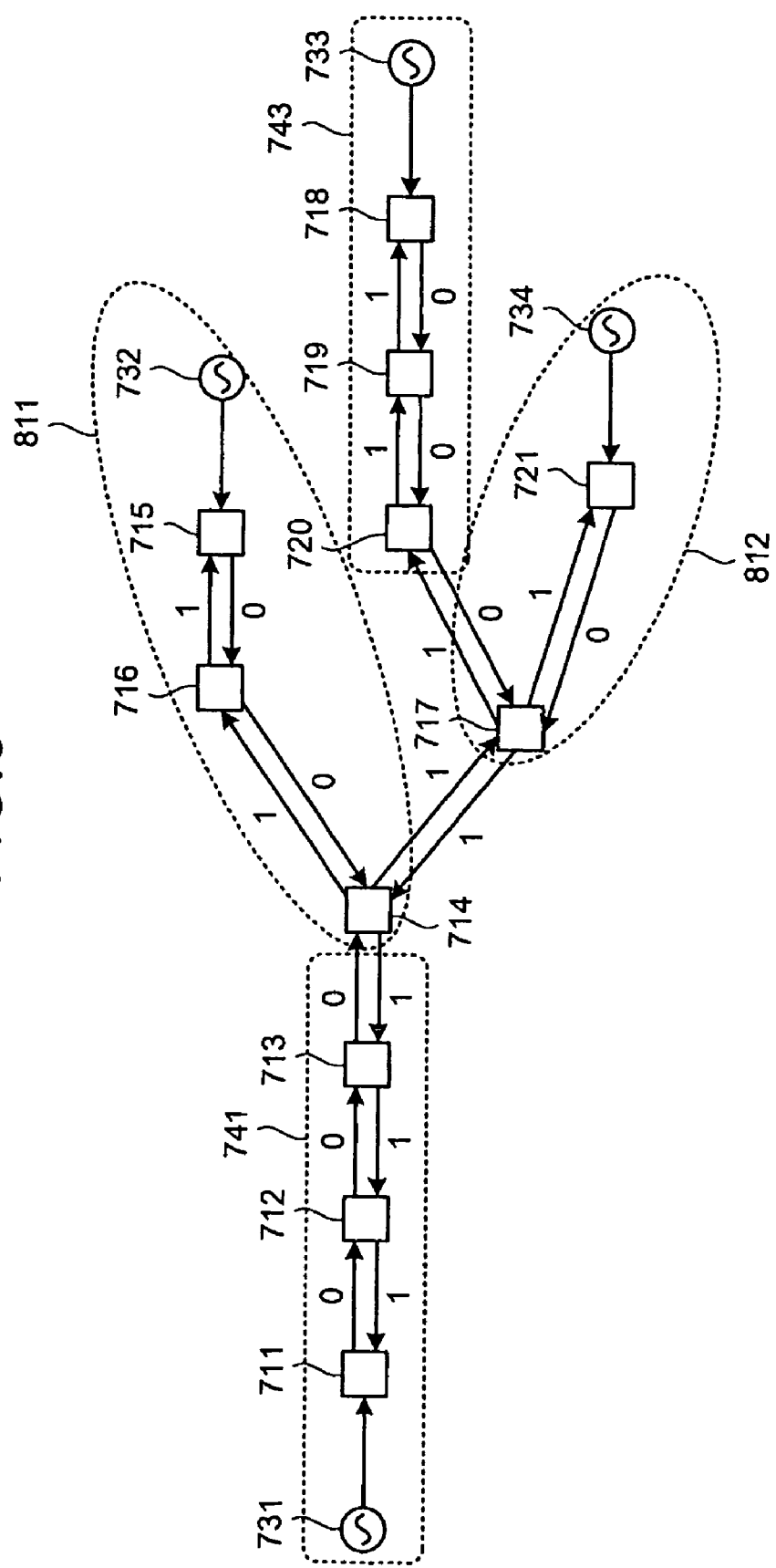
FIG. 8 is another diagram of the communication system according to the second embodiment.

FIG. 8 is another diagram of the communication system according to the second embodiment. In FIG. 8, components identical to those depicted in FIG. 7 are given identical reference numerals and the description thereof is omitted. In the state depicted in FIG. 7, a clock bit "0" is transmitted to the communication apparatus 714 from each of the communication apparatuses 713 and 716.

From among the communication apparatuses 713 and 716, the communication apparatus 714 selects, as a clock source, the communication apparatus having a small number of relays from a supplying apparatus. The number of relays from the supplying apparatus 731 to the communication apparatus 713 is three. The number of relays from the supplying apparatus 732 to the communication apparatus 716 is two. Therefore, the communication apparatus 714 selects the communication apparatus 716 as the clock source.

Similarly, the clock bit "0" is transmitted to the communication apparatus 717 from each of the communication apparatuses 720 and 721. The number of relays from the supplying apparatus 733 to the communication apparatus 720 is three. The number of relays from the supplying apparatus 734 to the communication apparatus 721 is one. Therefore, the communication apparatus 717 selects the communication apparatus 721 as the clock source.

Therefore, as indicated by a dotted line frame 811, of the respective clocks of the communication apparatuses 714 to 716 are synchronized with the clock supplied from the supplying apparatus 732. As indicated by a dotted line frame 812, of the respective clocks of the communication apparatuses 717 and 721 are synchronized with the clock supplied from the supplying apparatus 734.

Figure 9:
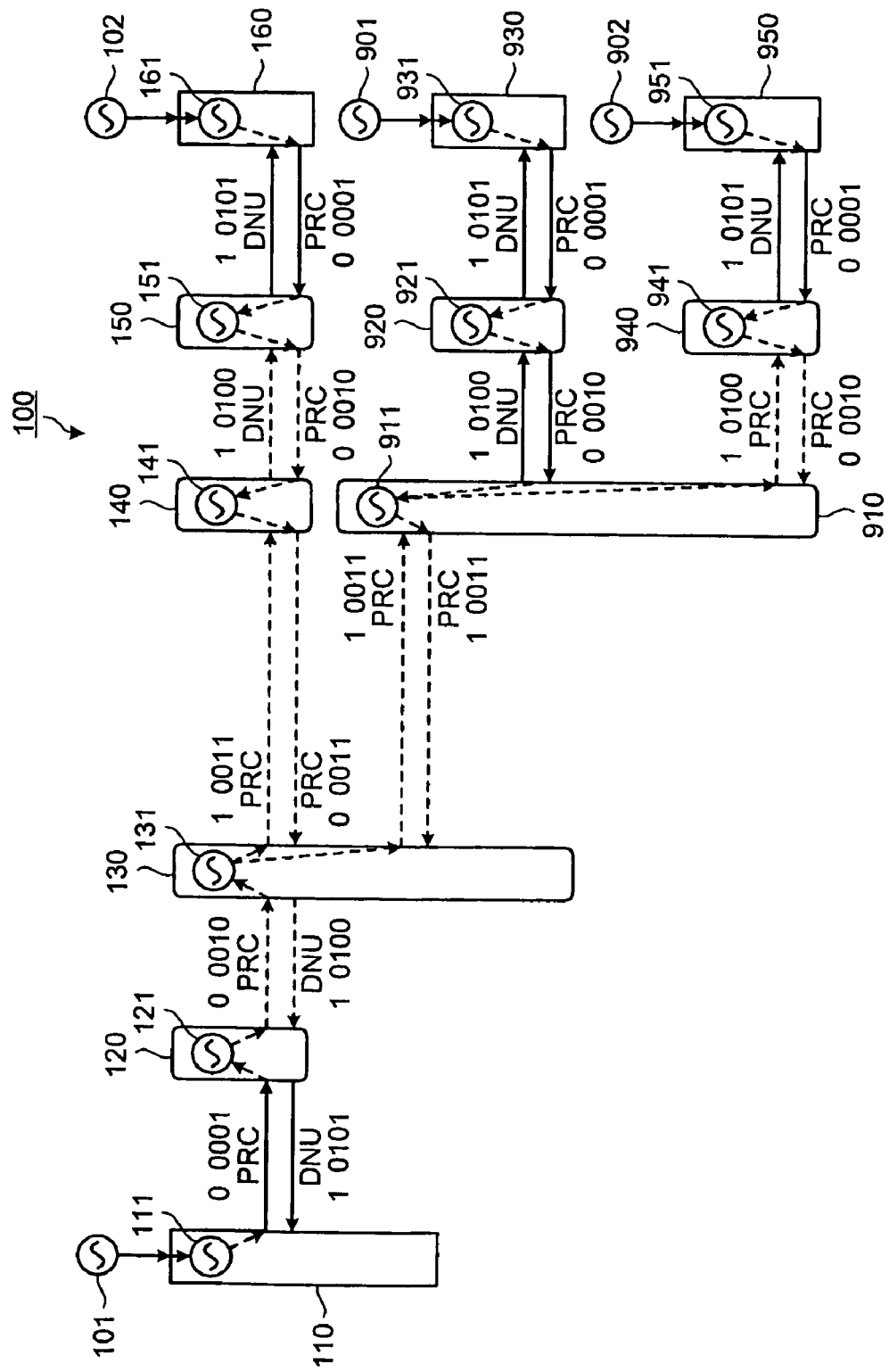
FIG. 9 is a block diagram of the communication system including the communication apparatuses according to the second embodiment.

FIG. 9 is a block diagram of the communication system including the communication apparatuses according to the second embodiment. In FIG. 9, components identical to those depicted in FIG. 1 are given identical reference numerals and the description thereof is omitted. As depicted in FIG. 9, in addition to the components depicted in FIG. 1, the communication system 100 includes supplying apparatuses 901 and 902 and communication apparatuses 910, 920, 930, 940, and 950.

The supplying apparatuses 901 and 902 synchronize with an external master clock, and synchronize with each other together with the supplying apparatuses 101 and 102. Clocks 911, 921, 931, 941, and 951 represent the clocks respectively of the communication apparatuses 910, 920, 930, 940, and 950.

The communication apparatus 910 is connected to the communication apparatuses 920 and 940. The communication apparatus 920 is connected to the communication apparatuses 910 and 930. The communication apparatus 930 is connected to the communication apparatus 920 and the supplying apparatus 901. The communication apparatus 940 is connected to the communication apparatuses 910 and 950. The communication apparatus 950 is connected to the communication apparatuses 940 and the supplying apparatus 902.

The communication apparatuses 130 and 910 are branching communication apparatuses to which clocks are supplied through three or more paths. The communication apparatus 130 is able to select the communication apparatus 120, 140, or 910 as a clock source. The communication apparatus 910 is able to select the communication apparatus 130, 920, or 940 as a clock source.

In addition to the selection of a clock source by comparing the SSMs and the SNs described in the first embodiment, a given communication apparatus executes selection of a clock source by comparing branching bits. The "branching bit" is information indicating whether a branching apparatus is included in a path from a supplying apparatus to a communication apparatus that is connected to the given apparatus on a side of the supplying apparatus.

The "branching bit" is information having two values, "0" and "1".

In FIG. 9, a branching bit is indicated on the left side of the SN. The branching bit "0" indicates that no branching apparatus is included in a path from a supplying apparatus to a communication apparatus that is connected to the given apparatus on a side of the supplying apparatus. The branching bit "1" indicates that a branching apparatus is included in a path from a supplying apparatus to a communication apparatus that is connected to the given apparatus on a side of the supplying apparatus. The branching bit is transmitted and received, for example, through an SOH overhead (see FIG. 4) or a packet signal (see FIG. 5) together with the SSM and the SN.

When plural communication apparatuses each having a clock of the highest quality level are present among the apparatuses connected to the given apparatus, the given apparatus selects, as a clock source, an apparatus for which the branching bit is "0" from among the communication apparatuses each having a clock of the highest quality level. When the branching bit is the same for the communication apparatuses each having a clock of the highest quality level, the given apparatus selects, as a clock source, an apparatus having a small SN from among the communication apparatuses each having a clock of the highest quality level.

To compare the branching bits of the communication apparatuses connected to the given apparatus, the given apparatus transmits, for a path through which a master clock is supplied, the branching bit to a communication apparatus that is among the communication apparatuses connected to the given apparatus and is not the communication apparatus connected to the given apparatus on a side of the supplying apparatus supplying the master clock. In a similar manner, the branching bit is transmitted for each of the paths. And, the given apparatus receives, for a path through which a master clock is supplied, the branching bit from a communication apparatus connected to the given apparatus on the side of the supplying apparatus supplying the master clock. In a similar manner, the branching bit is received for each of the paths.

More specifically, for the path through which a clock is supplied from the supplying apparatus 101, the communication apparatus 110 transmits the branching bit "0" to the communication apparatus 120 because no communication apparatus connected on the supplying apparatus 101 side of the apparatus and the communication apparatus 120 is not a branching communication apparatus. For each of the paths through which clocks are supplied from the supplying apparatus 102, 901, and 902, the communication apparatus 110 receives the branching bit "1" from the communication apparatus 120.

For the path through which a clock is supplied from the supplying apparatus 101, the communication apparatus 120 receives the branching bit "0" from the communication apparatus 110. The communication apparatus 120 receives the branching bit "0" from the communication apparatus 110 connected to communication apparatus 120 on a side of the supplying apparatus 101, and the communication apparatus 120, not being a branching communication apparatus, transmits the branching bit "0" to the communication apparatus 130.

For each of the paths through which a clock is supplied from the supplying apparatuses 102, 901, and 902, the communication apparatus 120 receives the branching bit "1" from the communication apparatus 130. Because the communication apparatus 120 receives the branching bit "1" from the communication apparatus 130 connected to the communication apparatus 120 on a side of the supplying apparatus 102, the communication apparatus 120 transmits the branching bit "1" to the communication apparatus 110.

For the path through which a clock is supplied from the supplying apparatus 101, the communication apparatus 130 receives the branching bit "0" from the communication apparatus 120. For the path through which a clock is supplied from the supplying apparatus 102, the communication apparatus 130 receives the branching bit "0" from the communication apparatus 140.

For each of the paths through which clocks are supplied from the supplying apparatuses 901, and 902, the communication apparatus 130 receives the branching bit "1" from the communication apparatus 910. The communication apparatus 130, being a branching communication apparatus, transmits the branching bit "1" to the communication apparatuses 120, 140, and 910.

For each of the paths through which clocks are supplied from the supplying apparatuses 101, 901, and 902, the communication apparatus 140 receives the branching bit from the communication apparatus 130. The communication apparatus 140, having received the branching bit "1" from the communication apparatus 130, transmits the branching bit "1" to the communication apparatus 150.

For the path through which a clock is supplied from the supplying apparatus 102, the communication apparatus 140 receives the branching bit "0" from the communication apparatus 150. The communication apparatus 130, not being a branching communication apparatus, transmits the branching bit "0" to the communication apparatus 130.

For each of the paths through which a clock is supplied from the supplying apparatuses 101, 901, and 902, the communication apparatus 150 receives the branching bit "1" from the communication apparatus 140. The communication apparatus 150, having received the branching bit "1" from the communication apparatus 140, transmits the branching bit "1" to the communication apparatus 160.

For the path through which a clock is supplied from the supplying apparatus 102, the communication apparatus 150 receives the branching bit "0" from the communication apparatus 160. The communication apparatus 150, not being a branching communication apparatus, transmits the branching bit "0" to the communication apparatus 140.

For each of the paths through which clocks are supplied from the supplying apparatuses 101, 901, and 902, the communication apparatus 160 receives the branching bit "1" from the communication apparatus 150. For the path through which a clock is supplied from the supplying apparatus 102, the communication apparatus 160 transmits the branching bit "0" to the communication apparatus 150 because no communication apparatus is present that is connected to the communication apparatus 150 on a side of the supplying apparatus 102 and the apparatus is not a branching communication apparatus.

For each of the paths through which clocks are supplied from the supplying apparatuses 101 and 102, the communication apparatus 910 receives the branching bit "1" from the communication apparatus 130. For the path through which a clock is supplied from the supplying apparatus 901, the communication apparatus 910 receives the branching bit "0" from the communication apparatus 920.

For the path through which a clock is supplied from the supplying apparatus 902, the communication apparatus 910 receives the branching bit "0" from the communication apparatus 940. The communication apparatus 910, being a branching communication apparatus, transmits the branching bit "1" to each of the communication apparatuses 130, 920, and 940.

For each of the paths through which a clock is supplied from the supplying apparatuses 101, 102, and 902, the communication apparatus 920 receives the branching bit "1" from the communication apparatus 910. The communication apparatus 920, having received the branching bit "1" from the communication apparatus 910, transmits the branching bit "1" to the communication apparatus 930.

For the path through which a clock is supplied from the supplying apparatuses 901, the communication apparatus 920 receives the branching bit "0" from the communication apparatus 930. The communication apparatus 920, not being a branching communication apparatus and having received the branching bit "0" from the communication apparatus 930, transmits the branching bit "0" to the communication apparatus 910.

For each of the paths through which clocks are supplied from the supplying apparatuses 101, 102, and 902, the communication apparatus 930 receives the branching bit "1" from the communication apparatus 920. For the path through which a clock is supplied from the supplying apparatus 901, the communication apparatus 930 transmits the branching bit "0" to the communication apparatus 920 because no communication apparatus is present that is connected to the communication apparatus 930 on a side of the supplying apparatus 901 and the communication apparatus 930 is not a branching communication apparatus.

For each of the paths through which clocks are supplied from the supplying apparatuses 101, 102, and 901, the communication apparatus 940 receives the branching bit "1" from the communication apparatus 910. The communication apparatus 940, having received the branching bit "1" from the communication apparatus 910, transmits the branching bit "1" to the communication apparatus 950.

For the path through which a clock is supplied from the supplying apparatus 902, the communication apparatus 940 receives the branching bit "0" from the communication apparatus 950. The communication apparatus 940 receives the branching bit "0" from the communication apparatus 950, and the communication apparatus 940, not being a branching communication apparatus, transmits the branching bit "0" to the communication apparatus 910.

For each of the paths through which clocks are supplied from the supplying apparatuses 101, 102, and 901, the communication apparatus 950 receives the branching bit "1" from the communication apparatus 940. For the path through which a clock is supplied from the supplying apparatus 902, the communication apparatus 950 transmits the branching bit "0" to the communication apparatus 940 because no communication apparatus is present connected to the communication apparatus 950 on a side of the supplying apparatus 902 and because the communication apparatus 950 is not a branching communication apparatus.

Each communication apparatus executes transmission and reception of the SN similarly to the case of the first embodiment. However, the value of each SN transmitted and received among the communication apparatuses will be depicted in the drawings and the description thereof is omitted. The communication apparatuses 130 and 910 that are branching communication apparatuses that receive plural SNs that are criteria for SNs to be transmitted. For example, concerning the SNs to be transmitted to the communication apparatus 910, the communication apparatus 130 can use the SN "0010" transmitted from the communication apparatus 120 and the SN "0011" transmitted from the communication apparatus 140 as the criteria for selection.

Whereas, for example, the communication apparatus 130 is set in advance to use a smaller SN as the criterion for selection. In this case, the communication apparatus 130 transmits, to the communication apparatus 910, the SN "0011", which is the result of adding one for the relay of the apparatus to the smaller SN "0010".

It is assumed that in the initial state of the communication system 100, no trouble occurs among the supplying apparatuses 101, 102, and the communication apparatuses. Each communication apparatus first transmits and receives the SNs above and the branching bits according to the connection relations among each other. In this case, the quality level of all the clocks of all the communication apparatuses are regarded to be the same and, therefore, each communication apparatus selects a clock source by comparing the branching bits. Each communication apparatus selects a clock source by comparing the SNs when the branching bits are equivalent.

The communication apparatus 110 selects the supplying apparatus 101 that is directly connected thereto as a clock source. The communication apparatus 160 selects the supplying apparatus 102 that is directly connected thereto as a clock source. The communication apparatus 930 selects the supplying apparatus 901 that is directly connected thereto as a clock source. The communication apparatus 950 selects the supplying apparatus 902 that is directly connected thereto as a clock source.

From among the communication apparatuses 110 and 120 connected to the communication apparatus 120, the communication apparatus 120 selects, as a clock source, the communication apparatus 110 that has transmitted the branching bit "0". From among the communication apparatuses 120, 140, and 910 connected to the communication apparatus 130, the communication apparatus 130 selects, as a clock source, the communication apparatus 120 that has transmitted the branching bit "0" and the smaller SN "0010".

From among the communication apparatuses 130 and 150 connected to the communication apparatus 140, the communication apparatus 140 selects, as a clock source, the communication apparatus 150 that has transmitted the branching bit "0". From among the communication apparatuses 140 and 160 connected to the communication apparatus 150, the communication apparatus 150 selects, as a clock source, the communication apparatus 160 that has transmitted the branching bit "0".

From among the communication apparatuses 130, 920, and 940 connected to the communication apparatus 910, the communication apparatus 910 selects, as a clock source, either one of the communication apparatuses 920 and 940 that each have transmitted the branching bit "0". In this case, the SNs transmitted from the communication apparatuses 920 and 940 are both "0010" and, therefore, either one of the communication apparatuses 920 and 940 may be selected. In this case, the communication apparatus 910 selects, as a clock source, the communication apparatus 920 according to the preference determined in advance.

From among the communication apparatuses 910 and 930 connected to the communication apparatus 920, the communication apparatus 920 selects, as a clock source, the communication apparatus 930 that has transmitted the branching bit "0". From among the communication apparatuses 910 and 950 connected to the communication apparatus 940, the communication apparatus 940 selects, as a clock source, the communication apparatus 950 that has transmitted the branching bit "0".

Each communication apparatus synchronizes the clock thereof with the clock of the selected apparatus. Each communication apparatus transmits, to the communication apparatuses that are connected thereto and is not the selected apparatus, the SSM that indicates the quality level of the clock of the selected apparatus. Each communication apparatus prevents looping of the clock by transmitting the DNU as the SSM to the selected apparatus.

Figure 10:
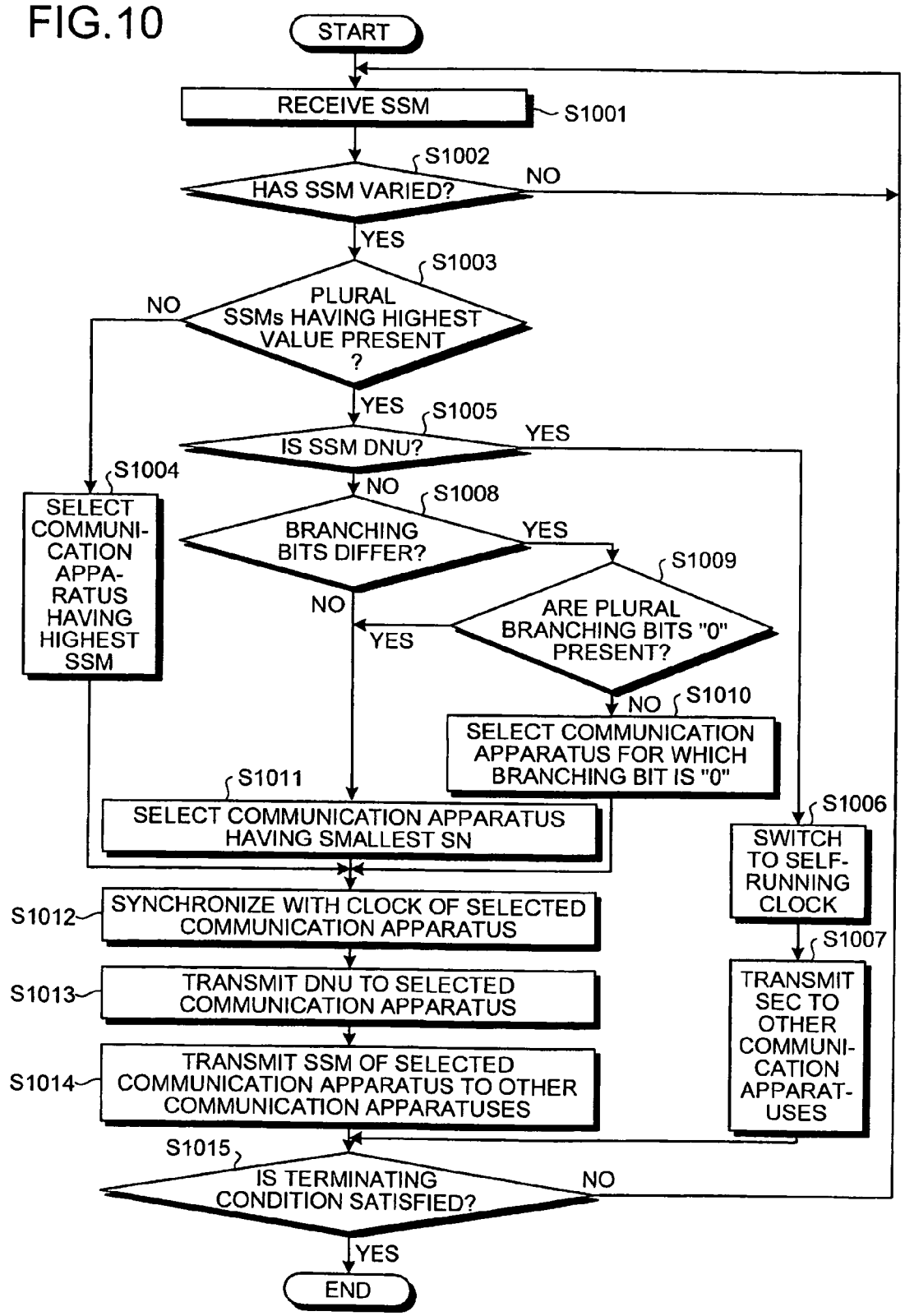
FIG. 10 is a flowchart of an example of the operations of the communication apparatus depicted in FIG. 7.

FIG. 10 is a flowchart of an example of the operations of the communication apparatus depicted in FIG. 7. This example is based the premise that the communication apparatuses transmit and receive the SNs and the branching bits to/from each other (see FIG. 9). A given communication apparatus receives the SSMs transmitted from the communication apparatuses that are connected to the given apparatus (step S1001). Whether any one of the SSMs received at step S1001 has varied since being received last is determined (step S1002).

At step S1002, when none of the SSMs has varied (step S1002: NO), the process returns to step S1001 and continues. When any one of the SSMs has varied (step S1002: YES), whether the highest value among the SSMs is held by plural SSMs received at step S1001 is determined (step S1003).

At step S1003, when the highest value is held by only one SSM (step S1003: NO), the communication apparatus that has transmitted the SSM having the highest value is selected as the clock source (step S1004) and the process proceeds to step S1012 and continues. When plural SSMs have the highest value (step S1003: YES), for each of the SSMs, whether the SSM is the DNU is determined (step S1005).

At step S1005, when each of the SSMs having the highest value is the DNU (step S1005: YES), the given apparatus switches the clock thereof to the self-running clock (step S1006). The communication apparatus transmits the SEC as the SSM to each of the communication apparatuses connected to the given apparatus (step S1007) and the process proceeds to step S1015 and continues.

At step S1005, when the SSMs having the highest value are not the DNU (step S1005: NO), whether the branching bits transmitted by the communication apparatuses that have transmitted the SSMs having the highest values differ from each other is determined (step S1008). When the branching bits differ (step S1008: YES), whether plural communication apparatuses that have transmitted the branching bit "0" are among the communication apparatuses that have transmitted the SSMs having the highest value is determined (step S1009).

At step S1009, when only one communication apparatus has transmitted the branching bit "0" (step S1009: NO), the communication apparatus that has transmitted the branching bit "0" is selected as the clock source (step S1010), and the process proceeds to step S1012 and continues. When plural communication apparatuses have transmitted the branching bit "0" (step S1009: YES), the process proceeds to step S1011 and continues.

When the branching bits transmitted by the communication apparatuses that have transmitted the SSMs having the highest value are equivalent at step S1008 (step S1008: NO), the communication apparatus that has transmitted the smallest SN is selected as the clock source (step S1011). The given apparatus synchronizes the clock thereof with the clock of the communication apparatus selected at step S1004, S1010, or S1011 (step S1012).

The given apparatus transmits the DNU to the communication apparatus selected at step S1004, S1010, or S1011 (step S1013). The given apparatus transmits the SSM of the communication apparatus selected at step S1004, S1010, or S1011 to a communication apparatus that is connected to the given apparatus and is not the selected communication apparatus (step S1014).

Whether the terminating condition is satisfied is determined (step S1015). For example, whether an ending command has been received from a user is determined. When the terminating condition is not satisfied (step S1015: NO), the process returns to step S1001 and continues. When the terminating condition is satisfied (step S1015: YES), a series of the operations comes to an end.

As described above, according to the second embodiment, the effect of the first embodiment is achieved and, by preferentially selecting the clock from the supply path that passes through no branching communication apparatus, the communication apparatuses connected in a mesh are able to synchronize with clocks from different supply paths respectively for groups of communication apparatuses constituting the terminating units of the communication system (see the dotted line frames 741 to 744 and the dotted line frames 811 and 812 of FIGS. 7 and 8).

Therefore, risks associated with the occurrence of trouble become distributed among the groups. Hence, trouble that has occurred in a supply path of the clock in one group can be prevented from affecting the communication apparatuses belonging to other groups, thereby enabling the communication system including the communication apparatuses connected in a mesh to be stably operated.

Figure 11:
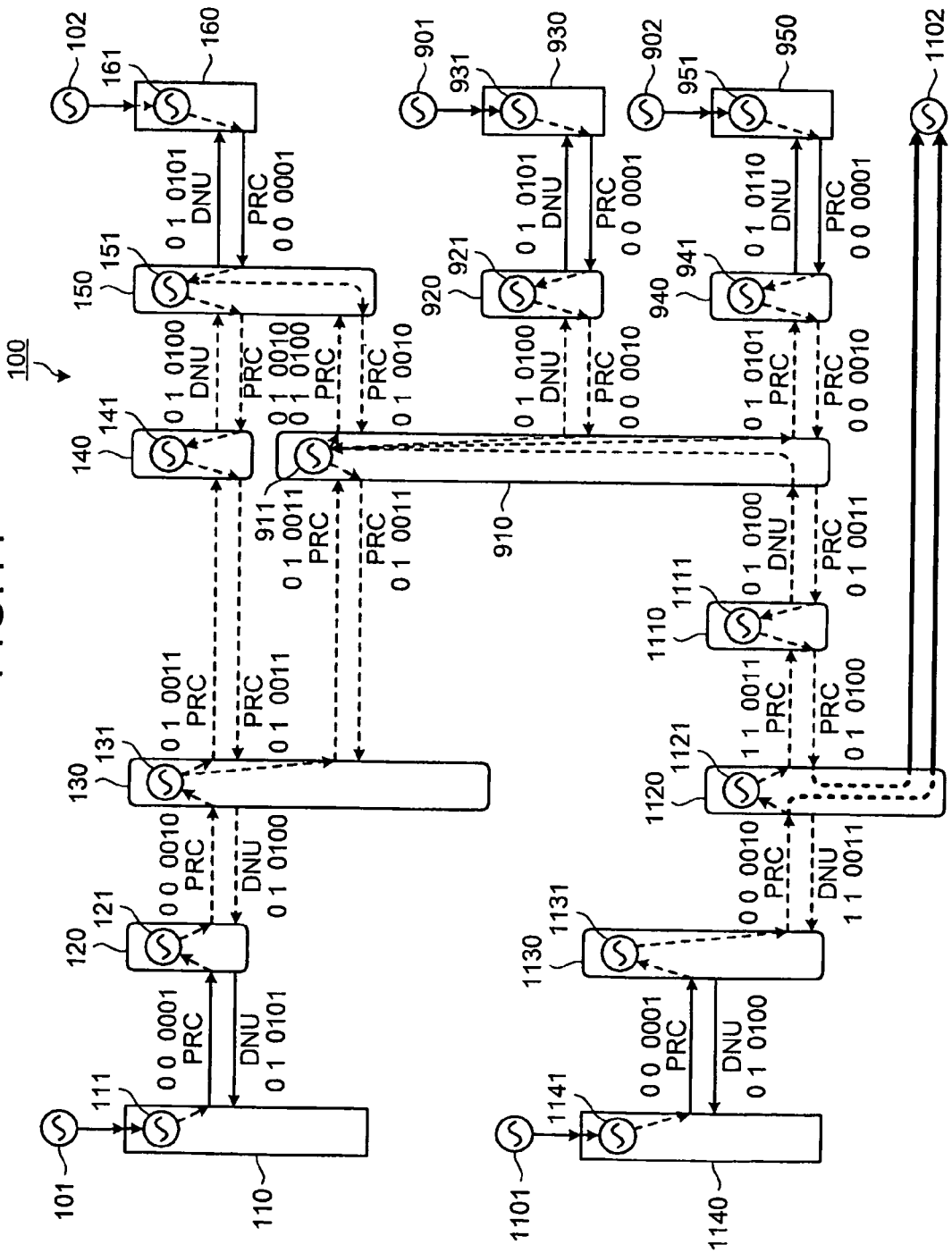
FIG. 11 is a block diagram of a communication system including communication apparatuses according to a third embodiment.

FIG. 11 is a block diagram of a communication system including communication apparatuses according to a third embodiment. In FIG. 11, components identical to those depicted in FIG. 9 are given identical reference numerals and the description thereof is omitted. As depicted in FIG. 11, the communication system 100 includes a supplying apparatus 1101, communication apparatuses 1110, 1120, 1130, and 1140 in addition to the components depicted in FIG. 9.

The supplying apparatus 1101 synchronizes with an external master clock, and the supplying apparatus 1101, 101, 102, 901, and 902 synchronize with each other. Clocks 1111, 1121, 1131, and 1141 represent the clocks respectively of the communication apparatuses 1110, 1120, 1130, and 1140. The communication apparatus 910 is connected to the communication apparatuses 130, 150, 920, and 940.

The communication apparatus 1110 is connected to the communication apparatuses 910 and 1120. The communication apparatus 1120 is connected to the communication apparatuses 1110 and 1130. The communication apparatus 1130 is connected to the communication apparatuses 1120 and 1140. The communication apparatus 1140 is connected to the communication apparatus 1130 and the supplying apparatus 1101.

The communication apparatus 1120 is an output communication apparatus that outputs its clock to external apparatuses. In the embodiment, a supplying apparatus 1102 is an external apparatus. The communication apparatus 1120 outputs the clock 1121 thereof to the supplying apparatus 1102. The supplying apparatus 1102 is provided outside the communication system 100 and supplies its clock to a communication system external to the communication system 100.

In addition to the selection of the clock source by a comparison the SSMs, the SNs, and the branching bits described in the first embodiment, each communication apparatus executes the selection of a clock source by comparing output bits. An "output bit" is information indicating whether an apparatus is an output communication apparatus that outputs its clock to external apparatuses. The "output bit" is binary information of two values, "0" and "1".

In FIG. 11, the output bit is indicated on the left side of the branching bit. An output bit "0" indicates that a given apparatus is not an output communication apparatus. An output bit "1" indicates that the given communication apparatus is an output communication apparatus. When plural communication apparatuses connected to the given apparatus has a clock at the highest quality level thereamong, from among these communication apparatuses, the given apparatus selects, as a clock source, the communication apparatus whose output bit is "0".

When the output bits of the communication apparatuses that have a clock at the highest quality level are equivalent, the given apparatus selects, as a clock source, the apparatus whose branching bit is "0". When the branching bits of the communication apparatuses are equivalent, the given communication apparatus selects, as a clock source, the communication apparatus having a small SN among the communication apparatuses that have a clock at the highest quality level.

To compare the output bits of the apparatuses connected to the given apparatus, the given apparatus transmits an output bit to the communication apparatuses connected to the given apparatus. And, the given apparatus receives output bits from the communication apparatuses connected to the given apparatus. An output bit is transmitted and received, for example, through the SOH overhead (see FIG. 4) or the packet signal (see FIG. 5) together with the SSM, the SN, and the branching bit.

More specifically, the communication apparatus 1120 that is an output communication apparatus outputting a clock to the supplying apparatus 1102, transmits the output bit "1" to each of the communication apparatuses 1110 and 1130 connected to the communication apparatus 1120. With the exception of the communication apparatus 1120, the communication apparatuses are not output communication apparatuses and, therefore, transmit and receive the output bits "0" to/from each other.

Each communication apparatus transmits and receives the SN and the branching bit similarly to the second embodiment. However, the value of each of the SN and the branching bit that are transmitted and received among the communication apparatuses will be depicted and the description thereof is omitted. It is assumed that, in the initial state of the communication system 100, no trouble occurs among the supplying apparatuses 101 and 102 and the communication apparatuses. Each communication apparatus transmits and receives the above SNs, branching bits, and output bits according to the connection relations with each other.

In this case, the quality levels of all the clocks of all the communication apparatuses are regarded to be the same and, therefore, each communication apparatus selects a clock source by comparing the output bits. Each communication apparatus selects a clock source by comparing the branching bits when the output bits are the same. Each communication apparatus selects a clock source by comparing the SNs when the branching bits are the same.

From among the communication apparatuses 910 and 1120 connected to the communication apparatus 1110, the communication apparatus 1110 selects, as a clock source, the communication apparatus 910 that has transmitted the output bit "0". From among the communication apparatuses 1120 and 1140 connected to the communication apparatus 1130, the communication apparatus 1130 selects, as a clock source, the communication apparatus 1140 that has transmitted the output bit "0".

The communication apparatus 1120 selects, as a clock source, the communication apparatus 1130 that has transmitted the branching bit "0" because each of the output bits transmitted from the communication apparatuses 1110 and 1130 connected to the communication apparatus 1120 is "0".

To synchronize the clock 1111 of the communication apparatus 1110 with the clock of the communication apparatus 910, the communication apparatus 1110 transmits the PRC as the SSM to the communication apparatus 1120 and transmits the DNU as the SSM to the communication apparatus 910. To synchronize the clock 1131 of the communication apparatus 1130 with the clock 1141 of the communication apparatus 1140, the communication apparatus 1130 transmits the PRC as the SSM to the communication apparatus 1120 and transmits the DNU as the SSM to the communication apparatus 1140.

As described above, the communication apparatuses 1110 and 1130 that are connected to the communication apparatus 1120 that is an output communication apparatus are caused to select preferentially, as a clock source, a communication apparatus other than the communication apparatus 1120. Thereby, each of the communication apparatuses 1110 and 1130 transmits the PRC as the SSM to the communication apparatus 1120.

Therefore, the communication apparatus 1120 is able to secure both of the communication apparatuses 1110 and 1130 connected to the apparatus as candidates to be selected as a clock source. When trouble occurs on a supply path of the clock 1131 that the communication apparatus 1120 is synchronized with, the communication apparatus 1120, independent of the clock source switching operation of other communication apparatuses, synchronizes the clock 1121 with the clock from the other path secured.

More specifically, in the state depicted in FIG. 11, when trouble occurs on the path from the communication apparatus 1140 to the communication apparatus 1130 and the SEC, as the SMM, is transmitted from the communication apparatus 1130, the communication apparatus 1120 synchronizes the clock 1121 with the clock 1111 of the communication apparatus 1110.

Figure 12:
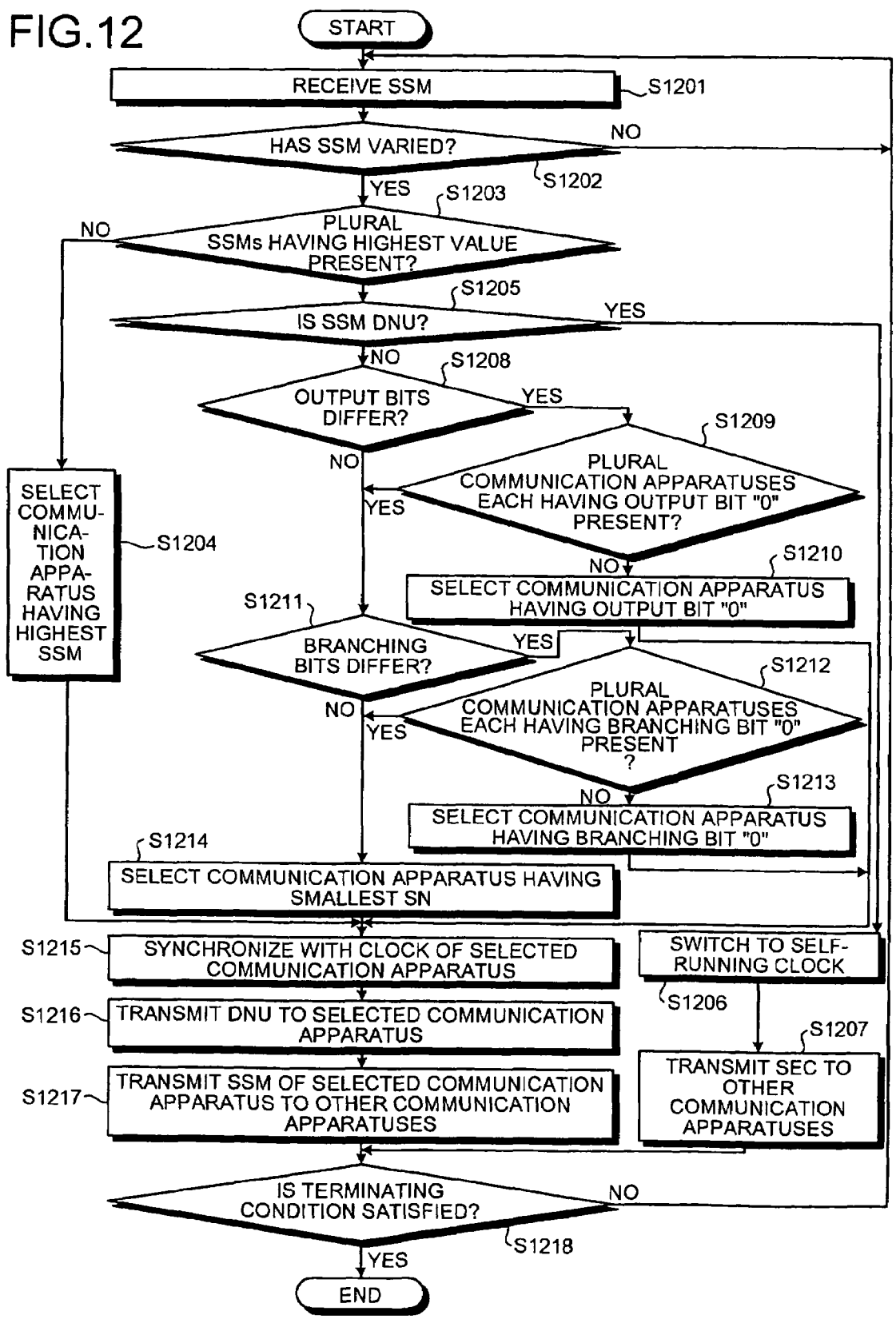
FIG. 12 is a flowchart of an example of the operations of the communication apparatus depicted in FIG. 11.

FIG. 12 is a flowchart of an example of the operations of the communication apparatus depicted in FIG. 11. This example is based on the premise that the communication apparatuses transmit and receive the SNs, the branching bits, and the output bits to/from each other (see FIG. 11). A given communication apparatus receives the SSMs transmitted from the communication apparatuses connected to the given apparatus (step S1201). Whether any one of the SSMs received has varied since being received last is determined (step S1202).

At step S1202, when none of the SSMs has varied (step S1202: NO), the process returns to step S1201 and continues. When any one of the SSMs has varied (step S1202: YES), whether the highest value among the SSMs received is held by plural SSMs is determined (step S1203).

At step S1203, when only one SSM, among the SSMs received, has the highest value (step S1203: NO), the communication apparatus that has transmitted the SSM having the highest value is selected as the clock source (step S1204) and, the process proceeds to step S1215 and continues. When plural SSMs have the highest value (step S1203: YES), whether each of the SSMs having the highest value is the DNU is determined (step S1205).

At step S1205, when the SSMs having the highest value are the DNU (step S1205: YES), the given apparatus switches its clock to the self-running clock (step S1206). The given apparatus transmits the SEC as the SSM to each of the communication apparatuses connected to the given apparatus (step S1207), and the process proceeds to step S1218 and continues.

At step 1205, when the SSMs having the highest value are not the DNU (step S1205: NO), whether the output bits transmitted by the communication apparatuses that have transmitted the SSMs having the highest values differ from each other is determined (step S1208). When the output bits differ (step S1208: YES), whether plural communication apparatuses that have transmitted the output bit "0" are among the communication apparatuses that have transmitted the SSMs having the highest values is determined (step S1209).

When only one communication apparatus is present that has transmitted the output bit "0" at step S1209 (step S1209: NO), the communication apparatus that has transmitted the output bit "0" is selected as the clock source (step S1210), and the process proceeds to step S1215 and continues. When plural communication apparatuses have transmitted the output bit "0" (step S1209: YES), the process proceeds to step S1211 and continues.

When the output bits are the same at step S1208 (step S1208: NO), whether the branching bits transmitted by the communication apparatuses that transmitted the highest SSMs differ from each other is determined (step S1211). When the branching bits differ (step S1211: YES), whether plural communication apparatuses that have transmitted the branching bit "0" are among the communication apparatuses that have transmitted the SSMs having the highest value is determined (step S1212).

When only one communication apparatus has transmitted the branching bit "0" at step S1212 (step S1212: NO), the communication apparatus that has transmitted the branching bit "0" is selected as the clock source (step S1213), and the process proceeds to step S1215 and continues. When plural communication apparatuses have transmitted the branching bit "0" (step S1212: YES), the process proceeds to step S1214 and continues.

When the branching bits transmitted by the communication apparatuses that have transmitted the SSMs having the highest values are the same at step S1211 (step S1211: NO), the communication apparatus that has transmitted the smallest SN is selected as the clock source (step S1214). The given apparatus synchronizes the clock of the given apparatus with the clock of the communication apparatus selected at step 1204, S1210, S1213, or S1214 (step S1215).

The given apparatus transmits the DNU to the communication apparatus selected at step S1204, S1210, S1213, or S1214 (step S1216). The given apparatus transmits the SSM of the selected communication apparatus to a communication apparatus that is connected to the given apparatus and is not the communication apparatus selected at step S1204, S1210, S1213, or S1214 (step S1217).

Whether the terminating condition is satisfied is determined (step S1218). For example, whether an ending command has been received from a user is determined. When the terminating condition is not satisfied (step S1218: NO), the process returns to step S1201 and continues. When the terminating condition is satisfied (step S1218: YES), a series of operations comes to an end.

As described above, according to the communication apparatus of the third embodiment, the effect of the communication apparatus according to the second embodiment is achieved, and a communication apparatus that is among the communication apparatuses connected to a given apparatus and is different from an output communication apparatus that outputs its clock to an external apparatus, is selected preferentially as the clock source of the given apparatus. Thereby, an output communication apparatus that outputs its clock to external apparatuses can secure redundant candidates for selecting a clock source. Therefore, even when trouble occurs in a communication system, degradation of the quality level of the clock to be externally output is prevented.

A case where each communication apparatus selects a clock source by comparing the branching bits when the output bits are the same is described in the third embodiment. However, the preference of each bit may be changed and, when the branching bits are the same, the clock source may be selected by comparing the output bits. The comparison of the branching bits may be omitted.

As described above, according to the communication apparatus and the control method thereof disclosed herein, the switching time of the clock source can be reduced and the quality of the clock during the occurrence of trouble can be improved. In the embodiments above, a case where the SN, the branching bit, and the output bit are transmitted and received separately from the SSM is described. However, for example, the SN, the branching bit, and the output bit may be transmitted and received using a reserve bit of an SSN, etc.

In the embodiments above, the SSM indicative of the quality level of the clock is described using the three values of the PRC, the SEC, and the DNU for the sake of simplicity in describing the operations. However, concerning the provisions for the SSM such as those for the code value and the preference of the SSM, it is assumed that the SSM follows the operations according to the conventional provisions of the International Telecommunication Union (ITU) and Generic Requirements (GR) and the SSM is applicable to any standard.

In the embodiments above, a case is taken as an example where, in addition to the SSM: four bits indicative of the quality of the clock, the SN: four bits, the clock branching information: one bit, and the clock output information: one bit, are necessary. However, undefined overhead bites in the case of the SDH/SONET, and padding data area in the case of a packet network, etc., may be used.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication apparatus that selects any one clock from among clocks supplied through a plurality of paths from supplying apparatuses of a master clock and that synchronizes a clock of the communication apparatus with the clock selected, the communication apparatus comprising:
   a receiving unit that receives information indicating a relay count on a path from a supplying apparatus to a first communication apparatus connected to the communication apparatus on a side of the supplying apparatus, the information being received for each of the paths from a plurality of the first communication apparatuses;
   a synchronizing unit that, based on the information received by the receiving unit, synchronizes the clock of the communication apparatus with a clock of a first communication apparatus having the relay count of a small number among the first communication apparatuses; and
   a transmitting unit that transmits, for each of the paths, information indicating a relay count from a supplying apparatus to the communication apparatus, the information being transmitted respectively to second communication apparatuses, wherein:
   the transmitting unit transmits, as the information indicating the relay count from the supplying apparatus to the communication apparatus, information formed by adding a relay count for the communication apparatus to the information that indicates the relay count and is received by the receiving unit;
   the receiving unit receives, for each of the paths, information indicating whether a branching communication apparatus to which clocks are supplied through three or more paths is included in a path from a supplying apparatus to a first communication apparatus, the information being received respectively from each of the first communication apparatuses,
   the transmitting unit transmits, for each of the paths, information indicating whether a branching communication apparatus is included in the path from the supplying apparatus to the communication apparatus, the information being transmitted respectively to the second communication apparatuses, and
   the synchronizing unit synchronizes the clock of the communication apparatus with the clock of a first communication apparatus on a path for which the information received by the receiving unit indicates that a branching communication apparatus is not included.

2. The communication apparatus according to claim 1, wherein the receiving unit receives information indicating a quality level of the clock of a first communication apparatus, the information being received respectively from each of the first communication apparatuses, the transmitting unit transmits information indicating the quality level of the clock of the communication apparatus to each of the second communication apparatuses, and the synchronizing unit synchronizes, based on the information received by the receiving unit, the clock of the communication apparatus with the clock of a first communication apparatus having a clock at the quality level that is highest among the first communication apparatuses and, when more than one of the first communication apparatuses has the quality level that is highest, the synchronizing unit synchronizes the clock of the communication apparatus with the clock of a first communication apparatus having the relay count of a small number among the first communication apparatuses that each have the quality level that is highest.

3. The communication apparatus according to claim 1, wherein the receiving unit receives information indicating a quality level of the clock of a first communication apparatus, the information being received respectively from each of the first communication apparatuses, the transmitting unit transmits information indicating the quality level of the clock of the communication apparatus to each of the second communication apparatuses, and the synchronizing unit synchronizes, based on the information received by the receiving unit, the clock of the communication apparatus with the clock of a first communication apparatus having a clock at the quality level that is highest among the first communication apparatuses and, when more than one of the first communication apparatuses has the quality level that is highest, the synchronizing unit synchronizes the clock of the communication apparatus with the clock of a first communication apparatus on a path for which the information received by the receiving unit indicates that a branching communication apparatus is not included.

4. A communication apparatus that selects any one clock from among clocks supplied through a plurality of paths from supplying apparatuses of a master clock and that synchronizes a clock of the communication apparatus with the clock selected, the communication apparatus comprising:

a receiving unit that receives information indicating a relay count on a path from a supplying apparatus to a first communication apparatus connected to the communication apparatus on a side of the supplying apparatus, the information being received for each of the paths from a plurality of the first communication apparatuses;

a synchronizing unit that, based on the information received by the receiving unit, synchronizes the clock of the communication apparatus with a clock of a first communication apparatus having the relay count of a small number among the first communication apparatuses; and a transmitting unit that transmits, for each of the paths, information indicating a relay count from a supplying apparatus to the communication apparatus, the information being transmitted respectively to second communication apparatuses, wherein:

the transmitting unit transmits, as the information indicating the relay count from the supplying apparatus to the communication apparatus, information formed by adding a relay count for the communication apparatus to the information that indicates the relay count and is received by the receiving unit;

the receiving unit receives information indicating whether a first communication apparatus is an output communication apparatus that outputs a clock to an external apparatus, the information is received respectively from each of the first communication apparatuses, the transmitting unit transmits information indicating whether the communication apparatus is an output communication apparatus, the information is transmitted to each of the second communication apparatuses, and the synchronizing unit synchronizes the clock of the communication apparatus with the clock of a first communication apparatus that has been indicated by the information received by the receiving unit to not be an output communication apparatus.

5. The communication apparatus according to claim 4, wherein the receiving unit receives information indicating a quality level of the clock of a first communication apparatus, the information being received respectively from each of the first communication apparatuses, the transmitting unit transmits information indicating the quality level of the clock of the communication apparatus to each of the second communication apparatuses, and the synchronizing unit synchronizes, based on the information received by the receiving unit, the clock of the communication apparatus with the clock of a first communication apparatus having a clock at the quality level that is highest among the first communication apparatuses and, when more than one of the first communication apparatuses has the quality level that is highest, the synchronizing unit synchronizes the clock of the communication apparatus with the clock of a first communication apparatus that has been indicated by the information received by the receiving unit to not be an output communication apparatus.

6. The communication apparatus according to claim 4, wherein the receiving unit receives information indicating a quality level of the clock of a first communication apparatus, the information being received respectively from each of the first communication apparatuses, the transmitting unit transmits information indicating the quality level of the clock of the communication apparatus to each of the second communication apparatuses, and the synchronizing unit synchronizes, based on the information received by the receiving unit, the clock of the communication apparatus with the clock of a first communication apparatus having a clock at the quality level that is highest among the first communication apparatuses and, when more than one of the first communication apparatuses has the quality level that is highest, the synchronizing unit synchronizes the clock of the communication apparatus with the clock of a first communication apparatus having the relay count of a small number among the first communication apparatuses that each have the quality level that is highest.

7. A communication method of selecting any one clock from among clocks supplied through a plurality of paths from supplying apparatuses of a master clock and of synchronizing a clock of the communication apparatus with the clock selected, the communication method comprising:

receiving information indicating a relay count on a path from a supplying apparatus to a first communication apparatus connected to the communication apparatus on a side of the supplying apparatus, the information being received for each of the paths from a plurality of the first communication apparatuses;

synchronizing, based on the information received at the receiving, the clock of the communication apparatus with a clock of a first communication apparatus having the relay count of a small number among the first communication apparatuses;

transmitting for each of the paths, information indicating a relay count from a supplying apparatus to the communication apparatus, the information being transmitted respectively to second communication apparatuses, wherein:

the transmitting comprises transmitting, as the information indicating the relay count from the supplying apparatus to the communication apparatus, information formed by adding a relay count for the communication apparatus to the information that indicates that relay count and is received in the receiving;

the receiving comprises receiving, for each of the paths, information indicating whether a branching communication apparatus to which clocks are supplied to three or more paths is included in a path from a supplying apparatus to a first communication apparatus, the information being received respectively from each of the first communication apparatuses;

the transmitting comprises transmitting, for each of the paths, information indicating whether a branching communication apparatus is included in the path from the supplying apparatus to the communication apparatus, the information being transmitted respectively to the second communication apparatuses; and the synchronizing comprises synchronizing the clock of the communication apparatus with the clock of a first communication apparatus on a path for which the information received in the receiving indicates that a branching communication apparatus is not included.

8. A communication method of selecting any one clock from among clocks supplied through a plurality of paths from supplying apparatuses of a master clock and of synchronizing a clock of the communication apparatus with the clock selected, the communication method comprising:

receiving information indicating a relay count on a path from a supplying apparatus to a first communication apparatus connected to the communication apparatus on a side of the supplying apparatus, the information being received for each of the paths from a plurality of the first communication apparatuses;

synchronizing, based on the information received at the receiving, the clock of the communication apparatus with a clock of a first communication apparatus having the relay count of a small number among the first communication apparatuses;

transmitting, for each of the paths, information indicating a relay count from a supplying apparatus to the communication apparatus, the information being transmitted respectively to second communication apparatuses, wherein:

the transmitting comprises transmitting, as the information indicating the relay count from the supplying apparatus to the communication apparatus, information formed by adding a relay count for the communication apparatus to the information that indicates that relay count and is received in the receiving;

the receiving comprises receiving information indicating whether a first communication apparatus is an output communication apparatus that outputs a clock to an external apparatus;

the information is received respectively from each of the first communication apparatuses;

the transmitting comprises transmitting information indicating whether the communication apparatus is an output communication apparatus, the information is transmitted to each of the second communication apparatuses; and the synchronizing comprises synchronizing the clock of the communication apparatus with the clock of a first communication apparatus that has been indicated by the information received by the receiving to not be an output communication apparatus.

* * * * *